(12) United States Patent
Kong et al.

(10) Patent No.: US 11,784,010 B2
(45) Date of Patent: Oct. 10, 2023

(54) ELECTRODE INCLUDING CAPACITOR MATERIAL DISPOSED ON OR INTERMINGLED WITH ELECTROACTIVE MATERIAL AND ELECTROCHEMICAL CELL INCLUDING THE SAME

(71) Applicant: GM GLOBAL TECHNOLOGY OPERATIONS LLC, Detroit, MI (US)

(72) Inventors: Dewen Kong, Shanghai (CN); Xiaochao Que, Shanghai (CN); Meiyuan Wu, Shanghai (CN); Si Chen, Shanghai (CN); Haijing Liu, Shanghai (CN); Mark W Verbrugge, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 987 days.

(21) Appl. No.: 16/685,389

(22) Filed: Nov. 15, 2019

(65) Prior Publication Data

US 2021/0151260 A1     May 20, 2021

(51) Int. Cl.
*H01G 11/06*     (2013.01)
*H01G 11/34*     (2013.01)
(Continued)

(52) U.S. Cl.
CPC ............ *H01G 11/06* (2013.01); *H01G 11/24* (2013.01); *H01G 11/34* (2013.01); *H01G 11/46* (2013.01);
(Continued)

(58) Field of Classification Search
CPC ............ H01M 4/06; H01M 4/13; H01M 4/62; H01G 11/06; H01G 11/24; H01G 11/34; H01G 11/46; H01G 11/72; H01G 11/86
(Continued)

(56) References Cited

U.S. PATENT DOCUMENTS 9,929,445 B2    3/2018   Yu et al.
10,297,885 B2    5/2019   Gayden et al.
(Continued)

FOREIGN PATENT DOCUMENTS

CN     101807683 A   *   8/2010
CN     107331528 A   *   11/2017
(Continued)

OTHER PUBLICATIONS

Amatucci, Glenn G. et al., "An Assymetric Hybrid Nonaqueous Energy Storage Cell," Journal of The Electrochemcial Society, 148 (8), pp. A930-A939 (2001) (Published online Jul. 13, 2001).
(Continued)

*Primary Examiner* — Sean P Cullen
(74) *Attorney, Agent, or Firm* — Harness, Dickey & Pierce, P.L.C.

(57) ABSTRACT

A capacitor-assisted electrode for an electrochemical cell that cycles lithium ions is provided. The capacitor-assisted electrode may include at least two electroactive materials disposed on one or more surfaces of a current collector. A first electroactive material of the at least two electroactive materials may have a first reversible specific capacity and forms a first electroactive material having a first press density. A second electroactive material of the at least two electroactive materials has a second reversible specific capacity and forms a second electroactive material having a second press density. The second reversible specific capacity may be different from the first reversible specific capacity. The second press density may be different from the first press density. One or more capacitor materials may be disposed on or intermingled with one or more of the at least two electroactive materials.

12 Claims, 4 Drawing Sheets

(51) Int. Cl.
  *H01G 11/24* (2013.01)
  *H01G 11/72* (2013.01)
  *H01G 11/86* (2013.01)
  *H01M 10/0525* (2010.01)
  *H01G 11/46* (2013.01)
  *H01M 4/06* (2006.01)
  *H01M 4/13* (2010.01)
  *H01M 4/62* (2006.01)
  *H01M 4/02* (2006.01)

(52) U.S. Cl.
  CPC ............ *H01G 11/72* (2013.01); *H01G 11/86* (2013.01); *H01M 4/06* (2013.01); *H01M 4/13* (2013.01); *H01M 4/62* (2013.01); *H01M 10/0525* (2013.01); *H01M 2004/021* (2013.01); *H01M 2004/028* (2013.01); *H01M 2220/20* (2013.01)

(58) Field of Classification Search
  USPC ............................................. 429/209, 231.8
  See application file for complete search history.

(56) References Cited

U.S. PATENT DOCUMENTS

| | | | |
|---|---|---|---|
| 10,597,783 B2 | 3/2020 | Liu et al. | |
| 10,658,663 B2 | 5/2020 | Zhang et al. | |
| 10,693,176 B2 | 6/2020 | Liu et al. | |
| 10,826,139 B2 | 11/2020 | Rich et al. | |
| 11,171,365 B2 | 11/2021 | Li et al. | |
| 11,196,097 B2 | 12/2021 | Gu et al. | |
| 11,205,798 B2 | 12/2021 | Li et al. | |
| 11,239,469 B2 | 2/2022 | Li et al. | |
| 11,295,901 B2 | 4/2022 | Hou et al. | |
| 11,340,299 B2 | 5/2022 | Liu et al. | |
| 11,404,714 B2 | 8/2022 | Hou et al. | |
| 2014/0287304 A1* | 9/2014 | Netz | H01M 4/13 156/60 |
| 2015/0010784 A1* | 1/2015 | Takahata | H01M 4/366 429/7 |
| 2016/0204428 A1* | 7/2016 | Sugawara | H01M 4/622 429/217 |
| 2018/0034094 A1 | 2/2018 | Liu et al. | |
| 2018/0097255 A1* | 4/2018 | Jung | H01M 4/587 |
| 2018/0287164 A1 | 10/2018 | Liu et al. | |
| 2019/0061555 A1 | 2/2019 | Liu et al. | |
| 2019/0067754 A1 | 2/2019 | Gu et al. | |
| 2019/0074510 A1 | 3/2019 | Zhang et al. | |
| 2019/0341648 A1 | 11/2019 | Wu et al. | |
| 2019/0372186 A1 | 12/2019 | Kong et al. | |
| 2020/0118770 A1 | 4/2020 | Liu et al. | |
| 2021/0110979 A1 | 4/2021 | Que et al. | |
| 2021/0110980 A1 | 4/2021 | Su et al. | |
| 2021/0111426 A1 | 4/2021 | Li et al. | |
| 2021/0135224 A1 | 5/2021 | Hou et al. | |
| 2021/0151260 A1 | 5/2021 | Kong et al. | |
| 2021/0151809 A1 | 5/2021 | Kong et al. | |

FOREIGN PATENT DOCUMENTS

| | | | | |
|---|---|---|---|---|
| CN | 107482166 A | * | 12/2017 | ........ H01M 10/0525 |
| CN | 110911669 A | * | 3/2020 | |
| CN | 112820878 A | | 5/2021 | |
| DE | 102020127241 A1 | | 5/2021 | |
| WO | 2019200609 A1 | | 10/2019 | |
| WO | 2019204964 A1 | | 10/2019 | |
| WO | WO-2019218327 A1 | | 11/2019 | |

OTHER PUBLICATIONS

Owejan, Jon P. et al., "Direct measurement of lithium transport in grpahite electrodes using neutrons," Electrochemica Acta 66 (2012), pp. 94-99; DOI: 10.1016/j.electacta.2012.01.047 (Published online Jan. 30, 2012).

Smith, Patricia H. et al., "Lithium-ion capacitors: Electrochemical performance and thermal behavior," Journal of Power Sources 243 (2013), pp. 982-992; DOI: 10.1016/j.jpowsour.2013.06.012 (Published online Jun. 12, 2013).

Sun, Yang-Kook et al., "High-energy cathode material for long-life and safe lithium batteries," Nature Materials 8 (2009), pp. 320-324; DOI: 10.1038/nmat2418 (Published online: Mar. 22, 2009).

Sun, Yang-Kook et al., "Nanostructured high-energy cathode materials for advanced lithium batteries," Nature Materials 11 (2012), pp. 942-947; DOI: 10.1038/nmat3435 (Published online: Oct. 7, 2012).

* cited by examiner

ELECTRODE INCLUDING CAPACITOR MATERIAL DISPOSED ON OR INTERMINGLED WITH ELECTROACTIVE MATERIAL AND ELECTROCHEMICAL CELL INCLUDING THE SAME

This section provides background information related to the present disclosure which is not necessarily prior art.

The present disclosure relates to capacitor-assisted gradient electrodes, electrochemical cells including capacitor-assisted gradient electrodes, and methods of formation relating thereto.

Advanced energy storage devices and systems are in demand to satisfy energy and/or power requirements for a variety of products, including automotive products such as start-stop systems (e.g., 12V start-stop systems), battery-assisted systems, hybrid electric vehicles ("HEVs"), and electric vehicles ("EVs"). Typical lithium ion batteries include at least two electrodes and an electrolyte and/or separator. One of the two electrodes serves as a positive electrode or cathode and the other electrode serves as a negative electrode or anode. A separator and/or electrolyte may be disposed between the negative and positive electrodes. The electrolyte is suitable for conducting lithium ions between the electrodes and, like the two electrodes, may be in solid and/or liquid form and/or a hybrid thereof. In instances of solid-state batteries, which include solid-state electrodes and a solid-state electrolyte, the solid-state electrolyte may physically separate the electrodes so that a distinct separator is not required.

Conventional rechargeable lithium-ion batteries operate by reversibly passing lithium ions back and forth between the negative electrode and the positive electrode. For example, lithium ions may move from the positive electrode to the negative electrode during charging of the battery, and in the opposite direction when discharging the battery. Such lithium-ion batteries can reversibly supply power to an associated load device on demand. More specifically, electrical power can be supplied to a load device by the lithium-ion battery until the lithium content of the negative electrode is effectively depleted. The battery may then be recharged by passing a suitable direct electrical current in the opposite direction between the electrodes.

During discharge, the negative electrode may contain a comparatively high concentration of intercalated lithium, which is oxidized into lithium ions and electrons. Lithium ions may travel from the negative electrode to the positive electrode, for example, through the ionically conductive electrolyte solution contained within the pores of an interposed porous separator. Concurrently, electrons pass through an external circuit from the negative electrode to the positive electrode. Such lithium ions may be incorporated into the material of the positive electrode by an electrochemical reduction reaction. The battery may be recharged or regenerated after a partial or full discharge of its available capacity by an external power source, which reverses the electrochemical reactions that transpired during discharge.

In various instances, however, the lithium-ion battery may experience limited regeneration capabilities, for example as a result of lithium plating on one or more surfaces of the negative electrode, especially during high power and frequent regeneration processes. Some materials, such as hard carbon, may experience improved regeneration capabilities and minimal plating. However, such materials are costly. Accordingly, it would be desirable to develop high-performance electrode designs and methods that enhance intercalation and de-intercalation rates and high-power regeneration capabilities.

SUMMARY

This section provides a general summary of the disclosure, and is not a comprehensive disclosure of its full scope or all of its features.

In various aspects, the present disclosure provides a capacitor-assisted electrode for an electrochemical cell that cycles lithium ions. The capacitor-assisted electrode includes at least two electroactive materials disposed on one or more surfaces of a current collector. A first electroactive material of the at least two electroactive materials may have a first reversible specific capacity. A second electroactive material of the at least two electroactive materials may have a second reversible specific capacity. The second reversible specific capacity may be different from the first reversible specific capacity. One or more capacitor materials may be disposed on or intermingled with one or more of the at least two electroactive materials.

In one aspect, the first electroactive material may form a first electroactive material layer. The first electroactive material layer may be disposed adjacent to the one or more surfaces of the current collector. The first electroactive material layer may define a first exposed surface. The second electroactive material may form a second electroactive material layer. The second electroactive material layer may be disposed adjacent to the first exposed surface of the first electroactive material layer.

In one aspect, the first electroactive material layer may have a first press density and the second electroactive material layer may have a second press density. The second press density may be greater than the first press density.

In one aspect, the second reversible specific capacity may be greater than the first reversible specific capacity.

In one aspect, the second electroactive material layer may define a second exposed surface and the at least two electroactive materials may further include a third electroactive material having a third reversible specific capacity. The third electroactive material may forms a third electroactive material layer. The third electroactive material layer may be disposed adjacent to the second exposed surface of the second electroactive material layer.

In one aspect, the first electroactive material layer may have a first press density. The second electroactive material layer may have a second press density. The third electroactive material layer may have a third press density. The third press density may be less than or equal to the second press density. The second press density may be less than or equal to the first press density.

In one aspect, the first press density, the second press density, and the third press density may be each independently greater than or equal to about 2.0 g/cc to less than or equal to about 3.5 g/cc.

In one aspect, the first press density, the second press density, and the third press density may be each independently greater than or equal to about 1.0 g/cc to less than or equal to about 2.0 g/cc.

In one aspect, the third reversible specific capacity may be greater than the second reversible specific capacity. The second reversible specific capacity may be greater than the first reversible specific capacity.

In one aspect, the third reversible specific capacity may be the same as the second reversible specific capacity. The second and third reversible specific capacities may be greater than the first reversible specific capacity.

In one aspect, the second reversible specific capacity may be greater than the third reversible specific capacity. The first reversible specific capacity may be greater than the second reversible specific capacity.

In one aspect, the one or more capacitor materials may be intermingled with the third electroactive material to form the third electroactive material layer.

In one aspect, the one or more capacitor materials may form a capacitor material layer. The capacitor material layer may be disposed adjacent to a third exposed surface of the third electroactive material layer.

In one aspect, the one or more capacitor materials may be selected from the group consisting of: cobalt oxide ($Co_3O_4$), manganese oxide ($MnO_2$), iridium oxide ($IrO_2$), niobium pentoxide ($Nb_2O_5$), ruthenium oxide ($RuO_2$), tantalum pentoxide ($Ta_2O_5$), tin oxide ($SnO_2$), vanadium oxide ($V_2O_5$), titanium disulfide ($TiS_2$), copper sulfide (CuS), iron sulfide (FeS), activated carbon, graphene, graphite, mesoporous carbon, macroporous carbon, single-walled carbon nanotubes, multi-wailed carbon nanotubes, carbon aerogels, activated carbon fiber cloth, polyaniline, polyacetylene, poly(3,4-ethylenedioxythiophene), poly(3,4-ethylenedioxythiophene), poly(4-styrenesulfonate), and combinations thereof.

In various other aspects, the present disclosure provides an electrochemical cell that cycles lithium ions. The electrochemical cell that cycles lithium ions includes a first electrode comprising a first electroactive material and a second electrode. The second electrode may include a first layer disposed adjacent to a surface of a current collector; at least one additional layer disposed adjacent to a surface of the first layer; and one or more capacitor materials disposed adjacent to or intermingled with one or more of the first layer and the at least one additional layer. The first layer may have a first reversible specific capacity. The additional layer may have an additional reversible specific capacity that is different from the first reversible specific capacity. The first layer and the at least one additional layer may each include a respective electroactive material.

In one aspect, the at least one additional layer may include a second layer and a third layer. The second layer may be disposed adjacent to the surface of the first layer. The third layer may be disposed adjacent to a surface of the second layer. The second layer may have a second reversible specific capacity. The third layer may have a third reversible specific capacity. The third reversible specific capacity may be greater than the second reversible specific capacity. The second reversible specific capacity may be greater than the first reversible specific capacity.

In one aspect, the first layer may have a first press density. The second layer may have a second press density. The third layer may have a third press density. The second press density maybe greater than the third press density. The first press density may be greater than the second press density. The first layer may include greater than about 0 wt. % to less than or equal to about 100 wt. % of the first electroactive material. The second layer may include greater than about 0 wt. % to less than or equal to about 80 wt. % of a second electroactive material. The third layer may include greater than about 0 wt. % to less than or equal to about 50 wt. % of a third electroactive material.

In one aspect, the first, second, and third electroactive materials may be the same. The one or more capacitor materials may form a first capacitor layer adjacent to a surface of the third electroactive layer.

In one aspect, the one or more capacitor materials may be intermingled with the third layer.

In one aspect, the current collector may be a first current collector and the one or more capacitor materials may be first capacitor materials. The first electrode may include a second layer disposed adjacent to a surface of a second current collector; at least one second additional layer disposed adjacent to a surface of the second layer; and one or more second capacitor materials disposed adjacent or intermingled with one or more of the first layer and the at least one second additional layer. The second layer may have a second reversible specific capacity. The additional layer may have an additional reversible specific capacity that is different from the second reversible specific capacity. The second layer and the at least one second additional layer may each comprise a respective electroactive material.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
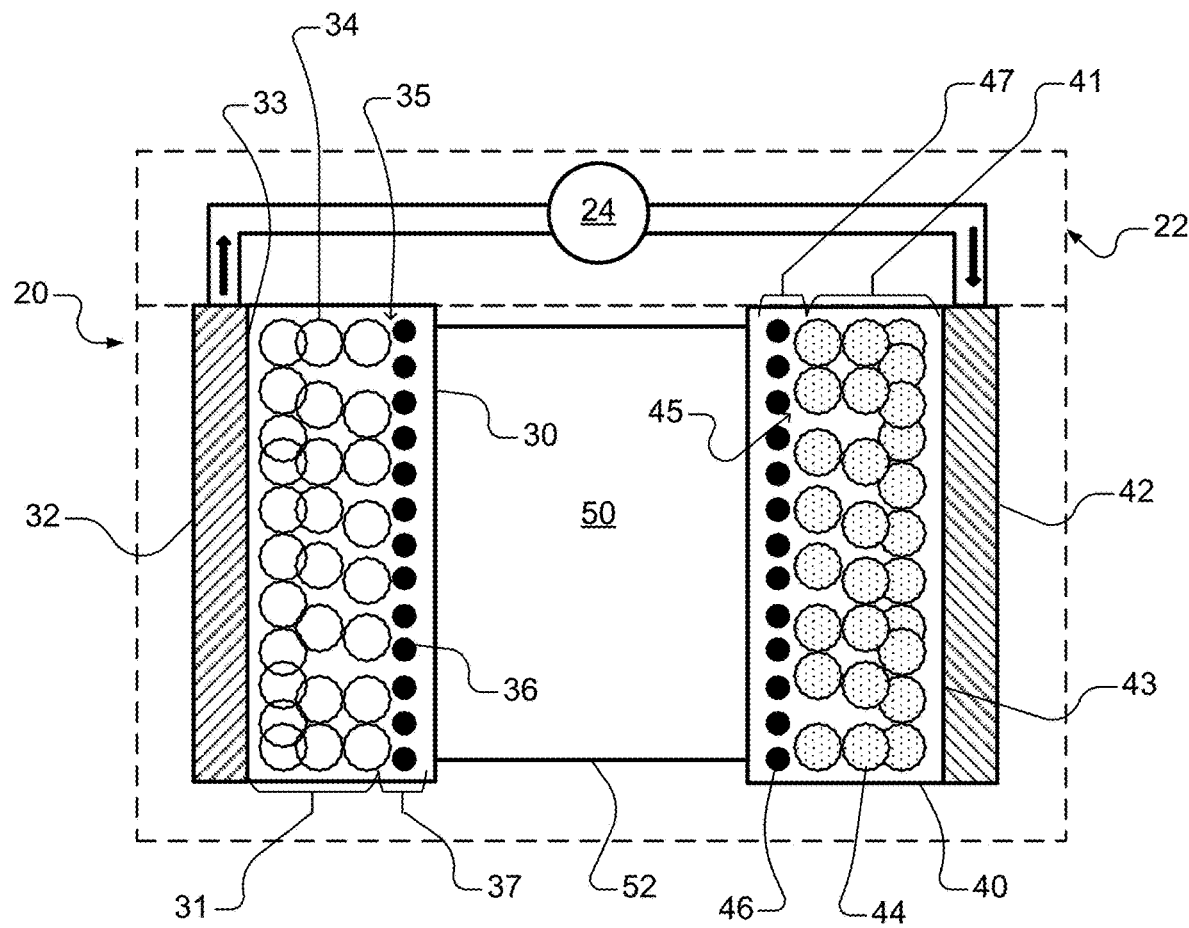
FIG. 1 is an example schematic illustration of an electrochemical cell having capacitor-assisted electrodes in accordance with various aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology pertains to capacitor-assisted gradient electrodes, electrochemical cells including capacitor-assisted gradient electrodes, and methods of formation relating thereto. For example, capacitor-material coatings or layers disposed on exposed surfaces of an electrode may absorb the regeneration current pulses, for example braking regeneration current during braking regeneration in battery electric vehicles (BEVs). Specific capacity and press density gradients may assist lithium deintercalation and intercalation in respective electrodes. Such electrodes and electrochemical cells integrate capacitors with lithium-ion batteries that may be used in, for example, automotive or other vehicles (e.g., motorcycles, boats), but may also be used in electrochemical cells used in a variety of other industries and applications, such as consumer electronic devices, by way of non-limiting example.

An exemplary and schematic illustration of an electrochemical cell (also referred to as the battery) 20 is shown in FIG. 1. The battery 20 includes a negative electrode 30, a positive electrode 40, and a separator 52 disposed between the electrodes 30, 40. As shown, the negative electrode 30 and positive electrode 40 are capacitor-assisted electrodes in accordance with certain aspects of the present disclosure, in that they include both electroactive materials and capacitor materials, such that they function as a hybrid electrode and capacitor. Batteries may incorporate solid-state electrolytes, liquid electrolytes, or semi-solid/gel electrolytes. As shown in FIG. 1, a separator 52 provides electrical separation and prevents physical contact between the electrodes 30, 40. For example, the separator 52 provides a minimal resistance path for internal passage of lithium ions, and in certain instances, related anions, during cycling of the lithium ions. In various aspects, the negative electrode 30, positive electrode 40, and/or the separator 52 may each include an electrolyte solution or system 50.

Any appropriate electrolyte 50, whether in solid, liquid, or gel form, capable of conducting lithium ions between the electrodes 30, 40, may be used in the battery 20. For example, as shown in FIG. 1, the electrolyte 50 may be a non-aqueous liquid electrolyte solution that includes a lithium salt dissolved in an organic solvent or a mixture of organic solvents. In certain variations, the separator 52 may be formed of a microporous insulating material, where liquid or semi-solid electrolyte can be imbibed into the pores. While not shown, in various aspects, the liquid electrolyte 50 and separator 52 may be substituted for solid-state electrolyte particles. For example, solid-state electrolyte particles may serve as both ion conductors (e.g., to transport lithium ions) and electrical insulators (e.g., to prevent charge or current from flowing from the negative electrode 30 to the positive electrode 40). For example, the separator 52 may be defined by a plurality of solid-state electrolyte particles (not shown). In certain variations, solid-state electrolyte particles (not shown) may also be mixed with electroactive materials 34, 44 present in the negative and positive electrodes 30, 40, respectively.

A negative electrode current collector 32 may be positioned at or near the negative electrode 30, and a positive electrode current collector 42 may be positioned at or near the positive electrode 40. The negative electrode current collector 32 and the positive electrode current collector 42 respectively collect and move free electrons to and from an external circuit 22. For example, an interruptible external circuit 22 and a load device 24 may connect the negative electrode 30 (through the negative electrode current collector 32) and the positive electrode 40 (through the positive electrode current collector 42). The positive electrode current collector 42 may be a metal foil, metal grid or screen, or expanded metal comprising aluminum or any other appropriate electrically conductive material known to those of skill in the art. The negative electrode current collector 32 may be a metal foil, metal grid or screen, or expanded metal comprising copper or any other appropriate electrically conductive material known to those of skill in the art.

The battery 20 can generate an electric current during discharge by way of reversible electrochemical reactions that occur when the external circuit 22 is closed (to connect the negative electrode 30 and the positive electrode 40) and the negative electrode 30 contains a relatively greater quantity of available lithium. The chemical potential difference between the positive electrode 40 and the negative electrode 30 drives electrons produced by the oxidation of inserted lithium at the negative electrode 30 through the external circuit 22 towards the positive electrode 40. Lithium ions, which are also produced at the negative electrode 30, are concurrently transferred through the separator 52 towards the positive electrode 40. The electrons flow through the external circuit 22 and the lithium ions migrate across the separator 52 to the positive electrode 40, where they may be reacted or intercalated. The electric current passing through the external circuit 22 can be harnessed and directed through the load device 24 until the available lithium in the negative electrode 30 is depleted and the capacity of the battery 20 is diminished.

The battery 20 can be charged or re-energized at any time by connecting an external power source (e.g., charging device) to the battery 20 to reverse the electrochemical reactions that occur during battery discharge. The connection of the external power source to the battery 20 compels the non-spontaneous oxidation of one or more metal elements at the positive electrode 40 to produce electrons and lithium ions. The electrons, which flow back towards the negative electrode 30 through the external circuit 22, and the lithium ions, which move across the separator 52 back towards the negative electrode 30, reduce at the negative electrode 30 and replenish it with lithium for consumption during the next battery discharge cycle. As such, each discharge and charge event is considered to be a cycle, where lithium ions are cycled between the positive electrode 40 and the negative electrode 30.

The external power source that may be used to charge the battery 20 may vary depending on size, construction, and particular end-use of the battery 20. Some notable and exemplary external power sources include, but are not limited to, AC power sources, such as an AC wall outlet and a motor vehicle alternator. In many battery 20 configurations, each of the negative electrode current collector 32, the negative electrode 30, the separator 52, the positive electrode 40, and the positive electrode current collector 42 are prepared as relatively thin layers (for example, from several microns to a millimeter or less in thickness) and assembled in layers connected in electrical parallel arrangement to provide a suitable electrical energy and power package. In various other instances, the battery 20 may include electrodes 30, 40 that are connected in series.

Further, in certain aspects, the battery 20 may include a variety of other components that, while not depicted here, are nonetheless known to those of skill in the art. For instance, the battery 20 may include a casing, gasket, vents, terminal caps, and any other conventional components or materials that may be situated within the battery 20, including between or around the negative electrode 30, the positive electrode 40, and/or the separator 52, by way of non-limiting example. As noted above, the size and shape of the battery 20 may vary depending on the particular applications for which it is designed. Battery-powered vehicles, hybrid (for example start-stop, microhybrid, and mild-hybrid) internal combustion vehicles, and hand-held consumer electronic devices are three non-limiting examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 24.

Accordingly, the battery 20 can generate electric current to a load device 24 that can be operatively connected to the external circuit 22. The load device 24 may be powered fully or partially by the electric current passing through the external circuit 22 when the lithium ion battery 20 is discharging. While the load device 24 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 24 may also be a power-generating apparatus that charges the battery 20 for purposes of storing energy.

With renewed reference to FIG. 1, the negative and positive electrodes 30, 40 and/or the separator 52 may each include an electrolyte solution or system 50. As noted above, the electrolyte 50 may be a non-aqueous liquid electrolyte solution, which may include a lithium salt dissolved in an organic solvent or a mixture of organic solvents. Numerous conventional non-aqueous liquid electrolyte solutions may be employed in the battery 20.

Appropriate lithium salts generally have inert anions. A non-limiting list of lithium salts that may be dissolved in an organic solvent or a mixture of organic solvents to form the non-aqueous liquid electrolyte solution include lithium hexafluorophosphate ($LiPF_6$); lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium difluorooxalatoborate ($LiBF_2(C_2O_4)$) (LiODFB), lithium tetraphenylborate ($LiB(C_6H_5)_4$), lithium bis-(oxalate)borate ($LiB(C_2O_4)_2$) (LiBOB), lithium tetrafluorooxalatophosphate ($LiPF_4(C_2O_4)$) (LiFOP), lithium nitrate ($LiNO_3$), lithium hexafluoroarsenate ($LiAsF_6$), lithium trifluoromethanesulfonate ($LiCF_3SO_3$), lithium bis(trifluoromethanesulfonimide) (LiTFSI) ($LiN(CF_3SO_2)_2$), lithium fluorosulfonylimide ($LiN(FSO_2)_2$) (LiFSI), and combinations thereof. In certain variations, the lithium salt is selected from lithium hexafluorophosphate ($LiPF_6$), lithium bis(trifluoromethanesulfonimide) (LiTFSI) ($LiN(CF_3SO_2)_2$), lithium fluorosulfonylimide ($LiN(FSO_2)_2$) (LiFSI), lithium fluoroalkylphosphate (LiFAP), lithium phosphate ($Li_3PO_4$), and combinations thereof.

These and other similar lithium salts may be dissolved in a variety of organic solvents, including but not limited to various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethyl methyl carbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane (DME), 1-2-diethoxyethane, ethoxymethoxyethane), cyclic ethers (e.g., tetrahydrofuran, 2-methyltetrahydrofuran), 1,3-dioxolane (DOL)), sulfur compounds (e.g., sulfolane), and combinations thereof. In various aspects, the electrolyte 50 may include greater than or equal to 1 M to less than or equal to about 2 M concentration of the one or more lithium salts. In certain variations, for example when the electrolyte has a lithium concentration greater than about 2 M or ionic liquids, the electrolyte 50 may include one or more diluters, such as fluoroethylene carbonate (FEC) and/or hydrofluoroether (HFE).

In various aspects, as described above, the electrolyte 50 may be a solid-state electrolyte, where the particles form both the electrolyte 50 and the separator 52. The solid-state electrolyte may include one or more solid-state electrolyte particles that may comprise one or more polymer-based components, oxide-based particles, sulfide-based particles, halide-based particles, borate-based particles, nitride-based particles, and hydride-based particles. Such a solid-state electrolyte may be disposed in a plurality of layers so as to define a three-dimensional structure. In various aspects, the polymer-based components may be intermingled with a lithium salt so as to act as a solid solvent. In certain variations, the polymer-based components may comprise one or more of polymer materials selected from the group consisting of: polyethylene glycol, polyethylene oxide (PEO), poly(p-phenylene oxide) (PPO), poly(methyl methacrylate) (PMMA), polyacrylonitrile (PAN), polyvinylidene fluoride (PVDF), polyvinylidene fluoride-co-hexafluoropropylene (PVDF-HFP), polyvinyl chloride (PVC), and combinations thereof. In one variation, the one or more polymer materials may have an ionic conductivity equal to about $10^4$ S/cm.

In various aspects, the oxide-based particles may comprise one or more garnet ceramics, LISICON-type oxides, NASICON-type oxides, and Perovskite-type ceramics. For example, the one or more garnet ceramics may be selected from the group consisting of: $Li_{6.5}La_3Zr_{1.75}Te_{0.25}O_{12}$, $Li_7La_3Zr_2O_{12}$, $Li_{6.2}Ga_{0.3}La_{2.95}Rb_{0.05}Zr_2O_{12}$, $Li_{6.85}La_{2.9}Ca_{0.1}Zr_{1.75}Nb_{0.25}O_{12}$, $Li_{6.25}Al_{0.25}La_3Zr_2O_{12}$, $L_{16.75}La_3Zr_{1.75}Nb_{0.25}O_{12}$, $Li_{6.75}La_3Zr_{1.75}Nb_{0.25}O_{12}$, and combinations thereof. The one or more LISICON-type oxides may be selected from the group consisting of: $Li_{14}Zn(GeO_4)_4$, $Li_{3+x}(P_{1-x}Si_x)O_4$ (where $0<x<1$), $Li_{3+x}Ge_xV_{1-x}O_4$ (where $0<x<1$), and combinations thereof. The one or more NASICON-type oxides may be defined by $LiMM'(PO_4)_3$, where M and M' are independently selected from Al, Ge, Ti, Sn, Hf, Zr, and La. For example, in certain variations, the one or more NASICON-type oxides may be selected from the group consisting of: $Li_{1+x}Al_xGe_{2-x}(PO_4)_3$ (LAGP) (where $0≤x≤2$), $Li_{1+x}Al_xTi_{2-x}(PO_4)_3$ (LAGP) (where $0≤x≤2$), $Li_{1-x}Y_xZr_{2-x}(PO_4)_3$ (LYZP) (where $0≤X≤2$), $Li_{1.3}Al_{0.3}Ti_{1.7}(PO_4)_3$, $LiTi_2(PO_4)_3$, $LiGeTi_2(PO_4)_3$, $LiGe_2(PO_4)_3$, $LiHf_2(PO_4)_3$, and combinations thereof. The one or more Perovskite-type ceramics may be selected from the group consisting of: $Li_{3.3}La_{0.53}TiO_3$, $LiSr_{1.65}Zr_{1.3}Ta_{1.7}O_9$, $Li_{2x-y}Sr_{1-x}Ta_yZr_{1-y}O_3$ (where X=0.75y and $0.60<y<0.75$), $Li_{3/8}Sr_{7/16}Nb_{3/4}Zr_{1/4}O_3$, $Li_{3x}La_{(2/3-x)}TiO_3$ (where $0<x<0.25$), and combinations thereof. In one variation, the one or more oxide-based materials may have an ionic conductivity greater than or equal to about $10^{-5}$ S/cm to less than or equal to about $10^{-1}$ S/cm.

In various aspects, the sulfide-based particles may include one or more sulfide-based materials selected from the group consisting of: $Li_2S-P_2S_5$, $Li_2S-P_2S_5$-$MS_x$ (where M is Si, Ge, and Sn and $0≤x≤2$), $Li_{3.4}Si_{0.4}P_{0.6}S_4$, $Li_{10}GeP_2S_{11.7}O_{0.3}$, $Li_{9.6}P_3S_{12}$, $Li_7P_3S_{11}$, $Li_9P_3S_9O_3$, $Li_{10.35}Si_{1.35}P_{1.65}S_{12}$, $Li_{9.81}Sn_{0.81}P_{2.19}S_{12}$, $Li_{10}(Si_{0.5}Ge_{0.5})P_2S_{12}$, $Li(Ge_{0.5}Sn_{0.5})P_2S_{12}$, $Li(Si_{0.5}Sn_{0.5})P_sS_{12}$, $Li_{10}GeP_2S_{12}$(LGPS), $Li_6PS_5X$ (where X is Cl, Br, or I), $Li_7P_2S_8I$, $Li_{10.35}Ge_{1.35}P_{1.65}S_{12}$, $Li_{3.25}Ge_{0.25}P_{0.75}S_4$, $Li_{10}SnP_2S_{12}$, $Li_{10}SiP_2S_{12}$, $Li_{9.54}Si_{1.74}P_{1.44}S_{11.7}Cl_{0.3}$, $(1-X)P_2S_{5-x}Li_2S$ (where $0.5≤x≤0.7$), and combinations thereof. In one variation, the one or more sulfide-based materials may have an ionic conductivity greater than or equal to about $10^{-7}$ S/cm to less than or equal to about 1 S/cm.

In various aspects, the halide-based particles may include one or more halide-based materials selected from the group consisting of: $Li_2CdCl_4$, $Li_2MgCl_4$, $Li_2CdI_4$, $Li_2ZnI_4$, $Li_3OCl$, LiI, $Li_5ZnI_4$, $Li_3OCl_{1-x}Br_x$ (where $0<x<1$), and combinations thereof. In one variation, the one or more halide-based materials may have an ionic conductivity greater than or equal to about $10^{-8}$ S/cm to less than or equal to about $10^{-1}$ S/cm.

In various aspects, the borate-based particles may include one or more borate-based materials selected from the group consisting of: $Li_2B_4O_7$, $Li_2O-(B_2O_3)-(P_2O_5)$, and combinations thereof. In one variation, the one or more borate-based materials may have an ionic conductivity greater than or equal to about $10^{-7}$ S/cm to less than or equal to about $10^{-2}$ S/cm.

In various aspects, the nitride-based particles may include one or more nitride-based materials selected from the group consisting of: $Li_3N$, $Li_7PN_4$, $LiSi_2N_3$, LiPON, and combinations thereof. In one variation, the one or more nitride-based materials may have an ionic conductivity greater than or equal to about $10^{-9}$ S/cm to less than or equal to about 1 S/cm.

In various aspects, the hydride-based particles may include one or more hydride-based materials selected from the group consisting of: $Li_3AlH_6$, $LiBH_4$, $LiBH_4$—LiX (where X is one of Cl, Br, and I), $LiNH_2$, $Li_2NH$, $LiBH_4$—$LiNH_2$, and combinations thereof. In one variation, the one or more hydride-based materials may have an ionic conductivity greater than or equal to about $10^{-7}$ S/cm to less than or equal to about $10^{-2}$ S/cm.

In still further variations, the electrolyte 50 may be a quasi-solid electrolyte comprising a hybrid of the above detailed non-aqueous liquid electrolyte solution and solid-state electrolyte systems—for example including one or more ionic liquids and one or more metal oxide particles, such as aluminum oxide ($Al_2O_3$) and/or silicon dioxide ($SiO_2$).

In various instances, the separator 52 may be a microporous polymeric separator including a polyolefin, including those made from a homopolymer (derived from a single monomer constituent) or a heteropolymer (derived from more than one monomer constituent), which may be either linear or branched. In certain aspects, the polyolefin may be polyethylene (PE), polypropylene (PP), or a blend of PE and PP, or multi-layered structured porous films of PE and/or PP. Commercially available polyolefin porous separator 52 membranes include CELGARD® 2500 (a monolayer polypropylene separator) and CELGARD® 2340 (a trilayer polypropylene/polyethylene/polypropylene separator) available from Celgard LLC.

When the separator 52 is a microporous polymeric separator, it may be a single layer or a multi-layer laminate. For example, in one embodiment, a single layer of the polyolefin may form the entire microporous polymer separator 52. In other aspects, the separator 52 may be a fibrous membrane having an abundance of pores extending between the opposing surfaces and may have a thickness of less than a millimeter, for example. As another example, however, multiple discrete layers of similar or dissimilar polyolefins may be assembled to form the separator 52.

The microporous polymer separator 52 may also include other polymers alternatively or in addition to the polyolefin, such as, but not limited to, polyethylene terephthalate (PET), polyvinylidene fluoride (PVdF), polyamide (nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polymethylpentene, polyolefin copolymers, acrylonitrile-butadiene styrene copolymers (ABS), polystyrene copolymers, polymethylmethacrylate (PMMA), polysiloxane polymers (e.g., polydimethylsiloxane (PDMS)), polybenzimidazole (PBI), polybenzoxazole (PBO), polyphenylenes, polyarylene ether ketones, polyperfluorocyclobutanes, polyvinylidene fluoride copolymers (e.g., PVdF-hexafluoropropylene or (PVdF-HFP)), and polyvinylidene fluoride terpolymers, polyvinylfluoride, liquid crystalline polymers (e.g., VECTRAN' (Hoechst AG, Germany) and ZENITE® (DuPont, Wilmington, Del.)), polyaramides, polyphenylene oxide, cellulosic materials, meso-porous silica, or a combination thereof.

Furthermore, the separator 52 may be mixed with a ceramic material or its surface may be coated in a ceramic material. For example, a ceramic coating may include alumina ($Al_2O_3$), silicon dioxide ($SiO_2$), or combinations thereof. Various conventionally available polymers and commercial products for forming the separator 52 are contemplated, as well as the many manufacturing methods that may be employed to produce such a microporous polymer separator 52.

The negative electrode 30 is formed from a lithium host material that is capable of functioning as a negative terminal of a lithium ion battery. For example, the negative electrode 30 may comprise a lithium host material (e.g., negative electroactive material) that is capable of functioning as a negative terminal of the battery 20. In various aspects, the negative electrode 30 may be defined by a plurality of negative electroactive material particles 34. Such negative electroactive material particles 34 may be disposed in one or more layers so as to define the three-dimensional structure of the negative electrode 30. In certain variations, the negative electrode 30 may further include the electrolyte 50, for example a plurality of electrolyte particles (not shown).

The negative electrode 30 may include a negative electroactive material that is lithium-based comprising, for example, a lithium metal and/or lithium alloy. In other variations, the negative electrode 30 may be a negative electroactive material that is silicon-based comprising silicon, for example, a silicon alloy, silicon oxide, or combinations thereof that may be further mixed, in certain instances, with graphite. In still other variations, the negative electrode 30 may include a negative electroactive material that is carbonaceous-based comprising one or more of graphite, graphene, carbon nanotubes (CNTs), and combinations thereof. In still further variations, the negative electrode 30 may comprise one or more lithium-accepting negative electroactive materials such as lithium titanium oxide ($Li_4Ti_5O_{12}$), one or more transition metals (such as tin (Sn)), one or more metal oxides (such as vanadium oxide ($V_2O_5$), tin oxide (SnO), titanium dioxide ($TiO_2$)), titanium niobium oxide ($Ti_xNb_yO_z$, where $0 \leq x \leq 2$, $0 \leq y \leq 24$, and $0 \leq z \leq 64$), metal alloys such as copper-tin alloy ($Cu_6Sn_5$), and one or more metal sulfides (such as iron sulfide (FeS)).

In various aspects, the negative electroactive materials in the negative electrode 30 may be optionally intermingled with one or more electrically conductive materials that provide an electron conductive path and/or at least one polymeric binder material that improves the structural integrity of the negative electrode 30. For example, the negative electroactive material may be optionally intermingled with binders such as poly(tetrafluoroethylene) (PTFE), sodium carboxymethyl cellulose (CMC), styrene-butadiene rubber (SBR), polyvinylidene fluoride (PVDF), nitrile butadiene rubber (NBR), styrene ethylene butylene styrene copolymer (SEBS), styrene butadiene styrene copolymer (SBS), lithium polyacrylate (LiPAA), sodium polyacrylate (Na-PAA), sodium alginate, lithium alginate, and combinations thereof. Electrically conductive materials may include carbon-based materials, powder nickel or other metal particles, or a conductive polymer. Carbon-based materials may include, for example, particles of carbon black, graphite, superP, acetylene black (such as KETCHEN™ black or DENKA™ black), carbon fibers and nanotubes, graphene, and the like. Examples of a conductive polymer include polyaniline, polythiophene, polyacetylene, polypyrrole, poly(3,4-ethylenedioxythiophene) polystyrene sulfonate, and the like.

The negative electrode 30 may include greater than or equal to about 50 wt. % to less than or equal to about 97 wt. % of the negative electroactive material, optionally greater than or equal to about 0 wt. % to less than or equal to about 60 wt. % of a solid-state electrolyte, optionally greater than or equal to about 0 wt. % to less than or equal to about 15 wt. % of electrically conductive materials, and optionally greater than or equal to about 0 wt. % to less than or equal to about 10 wt. % of a binder.

In various aspects, the negative electrode 30 further includes one or more first capacitor materials 36 disposed on, or in certain aspects, intermingled with the negative electroactive material particles 34. For example, as seen in FIG. 1, the negative electrode 30 may have a first region or layer 31 comprising the negative electroactive material particles 34 and a second region or layer 37 comprising the one or more first capacitor materials 36. In certain aspects, the first region or layer 31 may be disposed on a surface 33 of the negative electrode current collector 32. The first region or layer 31 may define an exposed surface 35. The second region or layer 37 may be disposed on the exposed surface 35. For example, the second layer 37 comprising the one or more first capacitor materials 36 may have a thickness greater than or equal to about 10 nm to less than or equal to about 1 mm, and in certain aspects, optionally greater than or equal to about 100 nm to less than or equal to about 200 µm; and the first layer 31 may have a thickness greater than or equal to about 1 µm to less than or equal to about 2000 µm.

While not shown, as appreciated by those of skill in the art, the first layer 31 and second layer 37 may not form discrete layers, but rather may have intermingled particles with different concentrations of the negative electroactive materials 34 and the one or more first capacitor materials 36, such that a gradient of distinct particles may be formed within the negative electrode 30. For example, where a concentration of the negative electroactive material particles 34 is highest adjacent to the surface 33 of the negative electrode current collector 32 and the first capacitor material particles 36 have a concentration that is greatest adjacent to the separator 52. Various embodiments of such gradients are further described below, by way of example.

The first capacitor material 36 may include one or more capacitor materials such as one or more metal oxides (MO, where M is one of cobalt (Co), ruthenium (Ru), niobium (Nb), iridium (Ir), manganese (Mn), chromium (Cr), tantalum (Ta), vanadium (V), and molybdenum (Mo) and $0.5 \leq x \leq 3.5$), for example one or more metal oxides selected from cobalt oxide ($Co_3O_4$), manganese oxide ($MnO_2$), iridium oxide ($IrO_2$), niobium pentoxide ($Nb_2O_5$), ruthenium oxide ($RuO_2$), tantalum pentoxide ($Ta_2O_5$), tin oxide ($SnO_2$), and vanadium oxide ($V_2O_5$); metal sulfides, for example one or more metal sulfides selected from titanium disulfide ($TiS_2$), copper sulfide (CuS), and iron sulfide (FeS); carbon-based materials, for example one or more carbonaceous materials selected from activated carbon, graphene, graphite, mesoporous carbon, macroporous carbon, single-walled carbon nanotubes, multi-walled carbon nanotubes, carbon aero gels, and activated carbon fiber cloth; and polymer-based materials, for example one or more polymer selected from polyaniline, polyacetylene, poly(3,4-ethylenedioxythiophene), and poly(3,4-ethylenedioxythiophene), poly(4-styrenesulfonate).

In this fashion, in various aspects, the first capacitor material 36 may include one or more capacitor materials selected from the group consisting of: cobalt oxide ($Co_3O_4$), manganese oxide ($MnO_2$), iridium oxide ($IrO_2$), niobium pentoxide ($Nb_2O_5$), ruthenium oxide ($RuO_2$), tantalum pentoxide ($Ta_2O_5$), tin oxide ($SnO_2$), vanadium oxide ($V_2O_5$), titanium disulfide ($TiS_2$), copper sulfide (CuS), iron sulfide (FeS), activated carbon, graphene, graphite, mesoporous carbon, macroporous carbon, single-walled carbon nanotubes, multi-wailed carbon nanotubes, carbon aerogels, activated carbon fiber cloth, polyaniline, polyacetylene, poly(3,4-ethylenedioxythiophene), poly(3,4-ethylenedioxythiophene), poly(4-styrenesulfonate), and combinations thereof.

In various aspects, the negative electrode 30 may include greater than or equal to about 50 wt. % to less than or equal to about 97 wt. % of the negative electroactive material, optionally greater than or equal to about 0 wt. % to less than or equal to about 60 wt. % of a solid-state electrolyte; optionally greater than or equal to about 0 wt. % to less than or equal to about 15 wt. % of electrically conductive materials, optionally greater than or equal to about 0 wt. % to less than or equal to about 10 wt. % of a binder, and optionally greater than or equal to about 0 wt. % to less than or equal to about 10 wt. % of the first capacitor material particles 36. Integration of such first capacitor material particles 36 may improve the pulsed high power capability, such as reaeration performance, of the battery 20.

The positive electrode 40 comprises a lithium-based positive electroactive material that is capable of undergoing lithium intercalation and deintercalation, alloying and dealloying, or plating and stripping, while functioning as a positive terminal of the capacitor battery 20. In various aspects, the positive electrode 40 may be defined by a plurality of electroactive material particles 44. Such positive electroactive material particles 44 may be disposed in one or more layers so as to define the three-dimensional structure of the positive electrode 40. In certain variations, the positive electrode 40 may further include the electrolyte 50, for example a plurality of electrolyte particles (not shown).

The positive electrode 40 may be one of a layered-oxide cathode, a spinel cathode, an olivine cathode, a tavorite cathode, a borate cathode, and a silicate cathode. For example, layered-oxide cathodes (e.g., rock salt layered oxides) comprise one or more lithium-based positive electroactive materials selected from $LiNi_xMn_yCo_{1-x-y}O_2$ (where $0 \leq x \leq 1$ and $0 \leq y \leq 1$), $LiNi_xMn_{1-x}O_2$ (where $0 \leq x \leq 1$), $Li_{1+x}MO_2$ (where M is one of Mn, Ni, Co, and Al and $0 \leq x \leq 1$) (for example $LiCoO_2$ (LCO), $LiNiO_2$, $LiMnO_2$, $LiNi_{0.5}Mn_{0.5}O_2$, NMC111, NMC523, NMC622, NMC721, NMC811, NMC165, NMC174, NCA). Spinel cathodes comprise one or more lithium-based positive electroactive materials selected from $LiMn_2O_4$ (LMO) and $LiNi_{0.5}Mn_{1.5}O_4$. Olivine-type cathodes comprise one or more lithium-based positive electroactive material such as $LiV_2(PO_4)_3$, $LiFePO_4$, $LiCoPO_4$, and $LiMnPO_4$. Tavorite-type cathodes comprise lithium-based positive electroactive materials such as $LiVPO_4F$. Borate-type cathodes comprise, for example, one or more lithium-based positive electroactive materials selected from $LiFeBO_3$, $LiCoBO_3$, and $LiMnBO_3$. Silicate-type cathodes comprise, for example, one or more lithium-based positive electroactive materials selected from $Li_2FeSiO_4$, $Li_2MnSiO_4$, and $LiMnSiO_4F$. In still further variations, the positive electrode 40 may comprise one or more other lithium-based positive electroactive materials, such as one or more of dilithium (2,5-dilithiooxy) terephthalate. In various aspects, the positive electroactive material may be optionally coated (for example by $LiNbO_3$ and/or $Al_2O_3$) and/or may be doped (for example by magnesium (Mg), zirconium (Zr), and/or fluorine (F)).

In various aspects, the positive electrode 40 may be optionally intermingled with one or more electrically conductive materials that provide an electron conductive path and/or at least one polymeric binder material that improves the structural integrity of the positive electrode 40. For example, the positive electrode 40 may be optionally intermingled with binders such as poly(tetrafluoroethylene) (PTFE), polyvinylidene fluoride (PVDF), nitrile butadiene rubber (NBR), styrene ethylene butylene styrene copolymer (SEBS), styrene butadiene styrene copolymer (SBS), lithium polyacrylate (LiPAA), sodium polyacrylate (Na-PAA), sodium alginate, lithium alginate, and combinations thereof. Electrically conductive materials may include carbon-based materials, powder nickel or other metal particles, or a conductive polymer. Carbon-based materials may include, for example, particles of carbon black, graphite, acetylene black (such as KETCHEN™ black or DENKA™ black), carbon fibers and nanotubes, graphene, and the like. Examples of a conductive polymer include polyaniline, polythiophene, polyacetylene, polypyrrole, and the like.

The positive electrode 40 may include greater than or equal to about 50 wt. % to less than or equal to about 97 wt. % of the positive electroactive material, optionally greater than or equal to about 0 wt. % to less than or equal to about 60 wt. % of a solid-state electrolyte, optionally greater than or equal to about 0 wt. % to less than or equal to about 15 wt. % of electrically conductive materials, and optionally greater than or equal to about 0 wt. % to less than or equal to about 10 wt. % of a binder. For example, in certain aspects, the positive electrode 40 may include about 95 wt. % of the positive electroactive material, about 3 wt. % of the electrically conductive materials, and about 2 wt. % of the binder.

In various aspects, the positive electrode 40 further includes one or more second capacitor materials disposed on, or in certain aspects, intermingled with, the positive electroactive material particles 44. For example, as seen in FIG. 1, the positive electrode 40 may have a first region or layer 41 comprising the positive electroactive material particles 44 and a second region or layer 47 comprising the one or more second capacitor materials 46. In certain aspects, the first region or layer 41 may be disposed on a surface 43 of the positive electrode current collector 42. The first region or layer 41 may define an exposed surface 45. The second region or layer 47 may be disposed on the exposed surface 45. For example, the second layer 47 comprising the one or more second capacitor materials 46 may have a thickness greater than or equal to about 10 nm to less than or equal to about 1 mm, and in certain aspects, optionally greater than or equal to about 200 nm to less than or equal to about 200 µm; and the second layer 47 may have a thickness greater than or equal to about 1 µm to less than or equal to about 2000 µm.

While not shown, as appreciated by those of skill in the art, the first layer 41 and the second layer 47 may not form discrete layers, but rather may have intermingled particles with different concentrations of the positive electroactive materials 44 and the one or more second capacitor materials 46, such that a gradient of distinct particles may be formed within the positive electrode 40. For example, where a concentration of the positive electroactive materials 44 is highest adjacent to the surface 43 of the positive electrode current collector 42 and the particles comprising the second capacitor materials 46 have a concentration that is greatest adjacent to the separator 52. Various embodiments of such gradients are further described below, by way of example.

The particles comprising the second capacitor material 46 may be the same or different from the particles comprising the first capacitor materials 36. For example, the particles comprising the second capacitor material 46 include one or more capacitor materials such as one or more metal oxides (MO, where M is one of cobalt (Co), ruthenium (Ru), niobium (Nb), iridium (Ir), manganese (Mn), chromium (Cr), tantalum (Ta), vanadium (V), and molybdenum (Mo) and $0.5 \leq x \leq 3.5$), for example one or more metal oxides selected from cobalt oxide ($Co_3O_4$), manganese oxide ($MnO_2$), iridium oxide ($IrO_2$), niobium pentoxide ($Nb_2O_5$), ruthenium oxide ($RuO_2$), tantalum pentoxide ($Ta_2O_5$), tin oxide ($SnO_2$), and vanadium oxide ($V_2O_5$); metal sulfides, for example one or more metal sulfides selected from titanium disulfide ($TiS_2$), copper sulfide (CuS), and iron sulfide (FeS); carbon-based materials, for example one or more carbonaceous materials selected from activated carbon, graphene, graphite, mesoporous carbon, macroporous carbon, single-walled carbon nanotubes, multi-walled carbon nanotubes, carbon aerogels, and activated carbon fiber cloth; and polymer-based materials, for example one or more polymer selected from polyaniline, polyacetylene, poly(3,4-ethylenedioxythiophene), and poly(3,4-ethylenedioxythiophene), poly(4-styrenesulfonate).

In this fashion, in various aspects, the second capacitor material 46 may include one or more capacitor materials selected from the group consisting of: cobalt oxide ($Co_3O_4$), manganese oxide ($MnO_2$), iridium oxide ($IrO_2$), niobium pentoxide ($Nb_2O_5$), ruthenium oxide ($RuO_2$), tantalum pentoxide ($Ta_2O_5$), tin oxide ($SnO_2$), vanadium oxide ($V_2O_5$), titanium disulfide ($TiS_2$), copper sulfide (CuS), iron sulfide (FeS), activated carbon, graphene, graphite, mesoporous carbon, macroporous carbon, single-walled carbon nanotubes, multi-walled carbon nanotubes, carbon aerogels, activated carbon fiber cloth, polyaniline, polyacetylene, poly(3,4-ethylenedioxythiophene), poly(3,4-ethylenedioxythiophene), poly(4-styrenesulfonate), and combinations thereof.

The positive electrode 40 may include greater than or equal to about 50 wt. % to less than or equal to about 97 wt. % of the positive electroactive material 44, optionally greater than or equal to about 0 wt. % to less than or equal to about 60 wt. % of a solid-state electrolyte, optionally greater than or equal to about 0 wt. % to less than or equal to about 15 wt. % of electrically conductive materials, optionally greater than or equal to about 0 wt. % to less than or equal to about 10 wt. % of a binder, and optionally greater than or equal to about 0 wt. % to less than or equal to about 10 wt. % of the second capacitor materials 46.

In accordance with various aspects of the present disclosure, one or more of the negative and positive electrodes 30, 40 illustrated in FIG. 1 may have a gradient structure comprising one or more electroactive material layers having varying concentrations of one or more electroactive materials, for example as illustrated in FIGS. 2A-2D. FIGS. 2A-2D are exemplary and schematic illustrations of capacity-assisted gradient electrodes.

Figure 2A:
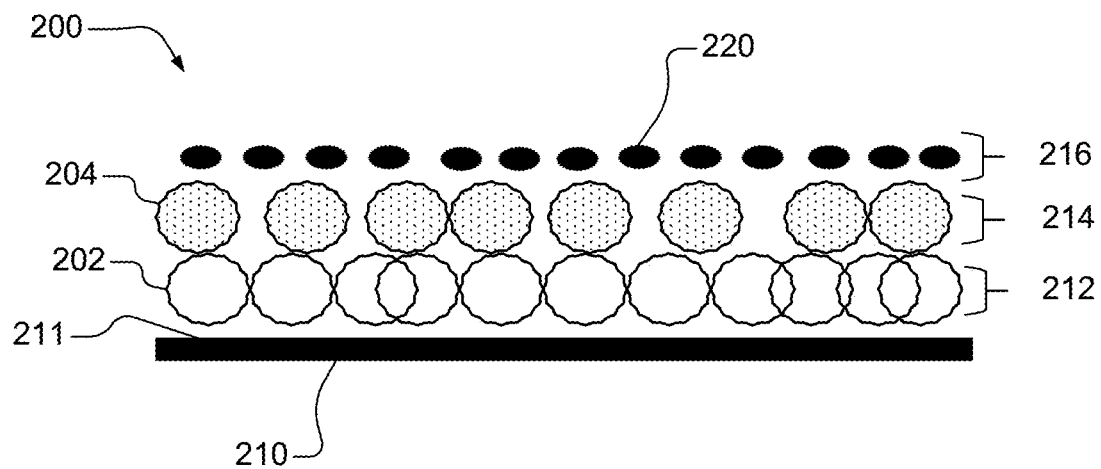
FIG. 2A is an example schematic illustration of a capacity-assisted gradient electrode in accordance with various aspects of the present disclosure.

The electrode 200 illustrated in FIG. 2A includes at least two electroactive materials 202, 204 disposed in electrical communication with a current collector 210. For example, the electrode 200 may include greater than or equal to about 20 wt. % to less than or equal to about 100 wt. %, and in certain aspects, optionally greater than or equal to about 40 wt. % to less than or equal to about 80 wt. %, of a first electroactive material 202; and greater than about 0 wt. % to less than or equal to about 80 wt. %, and in certain aspects, optionally greater than or equal to about 20 wt. % to less than or equal to about 60 wt. %, of a second electroactive material 204.

In various aspects, the at least two electroactive materials 202, 204 may be disposed on or adjacent one or more surfaces of the current collector 210. For example, as illustrated, the at least two electroactive materials 202, 204 may be disposed on or adjacent a first surface 211 of the current collector 210. The skilled artisan will appreciate that in various aspects, the at least two electroactive materials

202, 204 may be further disposed on or adjacent one or more other surfaces of the current collector 210. For example, on or adjacent a second surface that opposes or is parallel with the first surface 211 of the current collector 210.

The first electroactive material 202 may form a first electroactive material layer 212, and the second electroactive material 204 may form a second electroactive material layer 214. The first electroactive material layer 212 may be disposed on or near the current collector 210. The second electroactive material layer 214 may be disposed on or near an exposed surface of the first electroactive material layer 212. The first electroactive material layer 212 may have a first press density, and the second electroactive material layer 214 may have a second press density. In certain instances, the first press density may be greater than the second press density.

For example, in the instance of positive electrodes, the first press density may be greater than or equal to about 2 g/cc to less than or equal to about 3.5 g/cc, and in certain aspects, optionally greater than or equal to about 3 g/cc to less than or equal to about 3.5 g/cc. The second press density may be greater than or equal to about 2 g/cc to less than or equal to about 3.5 g/cc, and in certain aspects, optionally greater than or equal to about 2.8 g/cc to less than or equal to about 3.3 g/cc. In the instance of negative electrodes, the first press density may be greater than or equal to about 1 g/cc to less than or equal to about 2 g/cc, and in certain aspects, optionally greater than or equal to about 1.6 g/cc to less than or equal to about 1.9 g/cc. The second press density may be greater than or equal to about 1 g/cc to less than or equal to about 2 g/cc, and in certain aspects, optionally greater than or equal to about 1.5 g/cc to less than or equal to about 1.8 g/cc.

Such a density differential may increase the availability of lithium transfer channels within the electrode 200, as well as improve the lithium transfer diffusion rate, decrease lithium content deviation, for example in the cathode during fast charging and/or high power braking regeneration processes, and enhance the durability of a battery or pack including the electrode 200.

In various aspects, the first and second electroactive materials 202, 204 may each comprise one or more positive electroactive materials, for example to form a layered-oxide cathode, a spinel cathode, an olivine cathode, a tavorite cathode, a borate cathode, and a silicate cathode. In certain aspects, the one or more positive electroactive materials may be independently selected from the group consisting of: $LiNi_xMn_yCo_{1-x-y}O_2$ (where $0 \leq x \leq 1$ and $0 \leq y \leq 1$), $LiNi_xMn_{1-x}O_2$ (where $0 \leq x \leq 1$), $Li_{1+x}MO_2$ (where M is one of Mn, Ni, Co, and Al and $0 \leq x \leq 1$) (for example $LiCoO_2$ (LCO), $LiNiO_2$, $LiMnO_2$, $LiNi_{0.5}Mn_{0.5}O_2$, NMC111, NMC523, NMC622, NMC721, NMC811, NMC165, NMC174, NCA), $LiMn_2O_4$ (LMO), $LiNi_{0.5}Mn_{1.5}O_4$, $LiV_2(PO_4)_3$, $LiFePO_4$, $LiCoPO_4$, $LiMnPO_4$, $LiVPO_4F$, $LiFeBO_3$, $LiCoBO_3$, $LiMnBO_3$, $Li_2FeSiO_4$, $Li_2MnSiO_4$, $LiMnSiO_4F$, dilithium (2,5-dilithiooxy)terephthalate, polyimide, and combinations thereof.

In various other aspects, the first and second electroactive materials 202, 204 may each comprise one or more negative electroactive materials independently selected from the group consisting of: lithium, lithium metal, silicon, silicon oxide, graphite, graphene, carbon nanotubes titanium oxide ($Li_4Ti_5O_{12}$), tin (Sn), tin oxide ($SnO_2$), tin alloy ($Cu_6Sn_5$), vanadium oxide ($V_2O_5$), titanium dioxide ($TiO_2$), titanium niobium oxide ($Ti_xNb_yO_z$, where $0 \leq x \leq 2$, $0 \leq y \leq 24$, and $0 \leq z \leq 64$), iron sulfide (FeS), and combinations thereof.

In each instance, the first electroactive material 202 may have a first average reversible specific capacity, and the second electroactive material 204 may have a second average reversible specific capacity. In various instances, the first average reversible specific capacity may be greater than the second average reversible specific capacity. For example, by way of non-limiting example, the first electroactive material 202 may comprise a nickel manganese cobalt oxide (NMC), such as NMC532 and/or NMC165, and the second electroactive material 204 may comprise a distinct NMC, such as NMC 721, where NMC 532 has a first specific capacity of about 160 mAh/g and NMC 721 has a second specific capacity of about 184 mAh/g. In another non-limiting example, the first electroactive material 202 may comprise graphite and the second electroactive material 204 may comprise graphite in combination with silica, wherein graphite has a first specific capacity of about 350 mAh/g and the graphite-silica combination has a second specific capacity of about 440 mAh/g.

In various aspects, similar to electrodes 30, 40 illustrated in FIG. 1, electrode 200 may further include one or more capacitor materials 220 disposed on, or in certain aspects, intermingled with, the at least two electroactive materials 202, 204. For example, the electrode 200 may comprise greater than or equal to about 0 wt. % to less than or equal to about 10 wt. %, and in certain aspects, optionally greater than or equal to about 0.01 wt. % to less than or equal to about 1 wt. %, of the one or more capacitor materials 220. In various aspects, as illustrated, the one or more capacitor materials 220 may be disposed on or near an exposed surface of the second electroactive material layer 214 so as to form a capacitor material layer 216. The capacitor material layer 216 may have a thickness greater than or equal to about 10 nm to less than or equal to about 1 mm, and in certain aspects, optionally greater than or equal to about 50 nm to less than or equal to about 20 μm. In certain instances, the capacitor material layer 216 may comprise greater than or equal to about 5 wt. % to less than or equal to about 97 wt. % of the one or more capacitor materials 220, optionally greater than or equal to about 0 wt. % to less than or equal to about 15 wt. % of a conductive material, and optionally greater than or equal to about 0 wt. % to less than or equal to about 40 wt. % of a binder.

The one or more capacitor materials 220 include one or more metal oxides (MOX, where M is one of cobalt (Co), ruthenium (Ru), niobium (Nb), iridium (Ir), manganese (Mn), chromium (Cr), tantalum (Ta), vanadium (V), and molybdenum (Mo) and $0.5 \leq x \leq 3.5$), for example one or more metal oxides selected from cobalt oxide ($Co_3O_4$), manganese oxide ($MnO_2$), iridium oxide ($IrO_2$), niobium pentoxide ($Nb_2O_5$), ruthenium oxide ($RuO_2$), tantalum pentoxide ($Ta_2O_5$), tin oxide ($SnO_2$), and vanadium oxide ($V_2O_5$); metal sulfides, for example one or more metal sulfides selected from titanium disulfide ($TiS_2$), copper sulfide (CuS), and iron sulfide (FeS); carbon-based materials, for example one or more carbonaceous materials selected from activated carbon, graphene, graphite, mesoporous carbon, macroporous carbon, single-walled carbon nanotubes, multi-walled carbon nanotubes, carbon aerogels, and activated carbon fiber cloth; and polymer-based materials, for example one or more polymer selected from polyaniline, polyacetylene, poly(3,4-ethylenedioxythiophene), and poly (3,4-ethylenedioxythiophene), poly(4-styrenesulfonate).

In this fashion, in various aspects, the one or more capacitor materials 220 may be selected from the group consisting of: cobalt oxide ($Co_3O_4$), manganese oxide ($MnO_2$), iridium oxide ($IrO_2$), niobium pentoxide ($Nb_2O_5$), ruthenium oxide ($RuO_2$), tantalum pentoxide ($Ta_2O_5$), tin oxide ($SnO_2$), vanadium oxide ($V_2O_5$), titanium disulfide ($TiS_2$), copper sulfide (CuS), iron sulfide (FeS), activated carbon, graphene, graphite, mesoporous carbon, macroporous carbon, single-walled carbon nanotubes, multi-walled carbon nanotubes, carbon aerogels, activated carbon fiber cloth, polyaniline, polyacetylene, poly(3,4-ethylenedioxythiophene), poly(3,4-ethylenedioxythiophene), poly(4-styrenesulfonate), and combinations thereof.

For example only, in instances where the first electroactive material 202 may comprise a lithium nickel manganese cobalt oxide (NMC), such as NMC532 and the second electroactive material 204 may comprise a distinct NMC, such as NMC 721, such as detailed above, the one or more capacitor materials 220 may comprise (single walled) carbon nanotubes. Further, for example only, in instances where the first electroactive material 202 comprises graphite and the second electroactive material 204 comprises graphite in combination with silica, also detailed above, the one or more capacitor materials 2200 may comprise graphene. Integration of the one or more capacitor materials 220 in combination with the specific capacity gradient of the electroactive materials improves safe, fast-charging capabilities, increases the uniformity of lithium distribution across the electrode 200, and avoids or decreases dendrite formation.

Figure 2B:
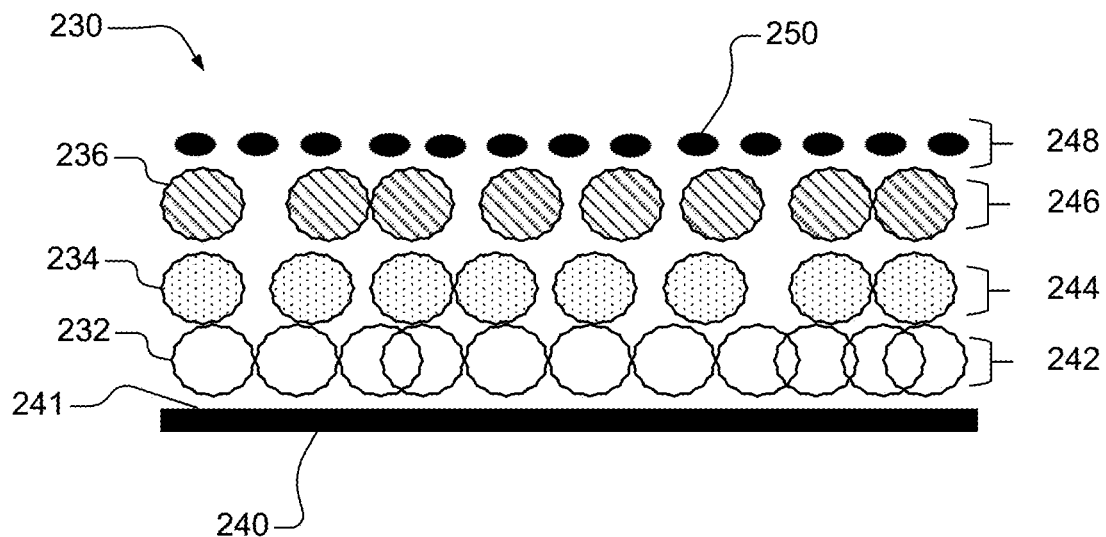
FIG. 2B is an example schematic illustration of another capacity-assisted gradient electrode in accordance with various aspects of the present disclosure.

The electrode 230, illustrated in FIG. 2B, includes at least three electroactive materials 232, 234, 236 disposed in electrical communication with a current collector 240. For example, the electrode 230 may comprise greater than or equal to about 20 wt. % to less than or equal to about 100 wt. %, and, in certain aspects, optionally greater than or equal to about 30 wt. % to less than or equal to about 80 wt. %, of a first electroactive material 232; greater than about 0 wt. % to less than or equal to about 80 wt. %, and in certain aspects, optionally greater than or equal to about 20 wt. % to less than or equal to about 70 wt. %, of a second electroactive material 234; and greater than about 0 wt. % to less than or equal to about 50 wt. %, and in certain aspects, optionally greater than or equal to about 20 wt. % to less than or equal to about 50 wt. %, of a third electroactive material 236.

In various aspects, the at least three electroactive materials 232, 234, 236 may be disposed on or adjacent one or more surfaces of the current collector 240. For example, as illustrated the at least three electroactive materials 232, 234, 236 may be disposed on or adjacent a first surface 241 of the current collector 240. The skilled artisan will appreciate that in various aspects, the at least three electroactive materials 232, 234, 236 may be further disposed on or adjacent one or more other surfaces of the current collector 210. For example, on or adjacent a second surface that opposes or is parallel with the first surface 241.

The first electroactive material 232 may form a first electroactive material layer 242, the second electroactive material 234 may form a second electroactive material layer 244, and the third electroactive material 236 may form a third electroactive material layer 246. The first electroactive material layer 242 may be disposed on or near the current collector 240. The second electroactive material layer 244 may be disposed on or near a first exposed surface of the first electroactive material layer 242, and the third electroactive material layer 246 may be disposed on or near a first exposed surface of the second electroactive material layer 244.

The first electroactive material layer 242 may have a first press density, the second electroactive material layer 244 may have a second press density, and the third electroactive material layer 246 may have a third press density. In certain instances, the first press density may be greater than the second press density and the second press density may be greater than the third press density.

For example, in the instance of positive electrodes, the first press density may be greater than or equal to about 2 g/cc to less than or equal to about 3.5 g/cc, and in certain aspects, optionally greater than or equal to about 3 g/cc to less than or equal to about 3.5 g/cc. For example, in certain aspects, the first press density may be about 3.46 g/cc. The second press density may be greater than or equal to about 2 g/cc to less than or equal to about 3.5 g/cc, and in certain aspects, optionally greater than or equal to about 2.9 g/cc to less than or equal to about 3.3 g/cc. For example, in certain aspects, the second press density may be about 3.28 g/cc. The third press density may be greater than or equal to about 2 g/cc to less than or equal to about 3.5 g/cc, and in certain aspects, optionally greater than or equal to about 2.8 g/cc to less than or equal to about 3.3 g/cc. For example, in certain aspects, the third press density may be about 3.1 g/cc.

In the instance of negative electrodes, the first press density may be greater than or equal to about 1 g/cc to less than or equal to about 2 g/cc, and in certain aspects, optionally greater than or equal to about 1.6 g/cc to less than or equal to about 1.9 g/cc. The second press density may be greater than or equal to about 1 g/cc to less than or equal to about 2 g/cc, and in certain aspects, optionally greater than or equal to about 1.5 g/cc to less than or equal to about 1.8 g/cc. The third press density may be greater than or equal to about 1 g/cc to less than or equal to about 2 g/cc, and in certain aspects, optionally greater than or equal to about 1.5 g/cc to less than or equal to about 1.7 g/cc.

In various aspects, the first, second, and third electroactive materials 232, 234, and 236 may each comprise one or more positive electroactive materials, for example to form a layered-oxide cathode, a spinel cathode, an olivine cathode, a tavorite cathode, a borate cathode, and a silicate cathode. In certain aspects, the one or more positive electroactive materials may be independently selected from the group consisting of: $LiNi_xMn_yCo_{1-x-y}O_2$ (where $0 \leq x \leq 1$ and $0 \leq y \leq 1$), $LiNi_xMn_{1-x}O_2$ (where $0 \leq x \leq 1$), $Li_{1+x}MO_2$ (where M is one of Mn, Ni, Co, and Al and $0 \leq x \leq 1$) (for example $LiCoO_2$ (LCO), $LiNiO_2$, $LiMnO_2$, $LiNi_{0.5}Mn_{0.5}O_2$, NMC111, NMC523, NMC622, NMC721, NMC811, NMC165, NMC174, NCA), $LiMn_2O_4$ (LMO), $LiNi_{0.5}Mn_{1.5}O_4$, $LiV_2(PO_4)_3$, $LiFePO_4$, $LiCoPO_4$, $LiMnPO_4$, $LiVPO_4F$, $LiFeBO_3$, $LiCoBO_3$, $LiMnBO_3$, $Li_2FeSiO_4$, $Li_2MnSiO_4$, $LiMnSiO_4F$, dilithium (2,5-dilithiooxy)terephthalate, polyimide, and combinations thereof.

In various other aspects, the first, second, and third electroactive materials 232, 234, and 236 may each comprise one or more negative electroactive materials independently selected from the group consisting of: lithium, lithium metal, silicon, silicon oxide, graphite, graphene, carbon nanotubes, titanium oxide ($Li_4Ti_5O_{12}$), tin (Sn), tin oxide ($SnO_2$), tin alloy ($Cu_6Sn_5$), vanadium oxide ($V_2O_5$), titanium dioxide ($TiO_2$), titanium niobium oxide ($Ti_xNb_yO_z$, where $0 \leq x \leq 2$, $0 \leq y \leq 24$, and $0 \leq z \leq 64$), iron sulfide (FeS), and combinations thereof.

In each instance, the first electroactive material 232 may have a first average reversible specific capacity, the second electroactive material 234 may have a second average reversible specific capacity, and the third electroactive material 236 may have a third average reversible specific capacity. In various instances, the first average reversible specific capacity may be greater than the second average reversible specific capacity, and the second average reversible specific capacity may be greater than the third average reversible specific capacity. For example, by way of non-limiting example, the first electroactive material 232 may comprise a lithium nickel manganese cobalt oxide (NMC), such as NMC 523, the second electroactive material 234 may comprise a distinct NMC, such as NMC 622, and the third electroactive material 236 may comprise yet another distinct NMC, such as NMC 721, where NMC 523 has a first specific capacity of about 160 mAh/g, NMC 622 has a second specific capacity of about 175 mAh/g, and NMC 721 has a third specific capacity of about 184 mAh/g. In another non-limiting example, the first, second, and third electroactive materials 232, 234, 236 may comprise graphite having different specific capacities. For example, the first electroactive material 232 may have a first specific capacity of about 320 mAh/g, the second electroactive material 234 may have a second specific capacity of about 340 mAh/g, and the third electroactive material 236 may have a third specific capacity of about 350 mAh/g.

In various aspects, similar to electrodes 30, 40 illustrated in FIG. 1 and electrode 200 illustrated in FIG. 2A, electrode 230 may further include one or more capacitor materials 250 disposed on, or in certain aspects, intermingled with, the at least three electroactive materials 232, 234, 236. For example, electrode 230 may comprise greater than or equal to about 0 wt. % to less than or equal to about 10 wt. %, and in certain aspects, optionally greater than or equal to about 0.01 wt. % to less than or equal to about 1 wt. %, of the one or more capacitor materials 250. In various aspects, as illustrated, the one or more capacitor materials 250 may be disposed on or near an exposed surface of the third electroactive material layer 246 so as to form a capacitor material layer 248. The capacitor material layer 248 may have a thickness greater than or equal to about 10 nm to less than or equal to about 1 mm, and in certain aspects, optionally greater than or equal to about 100 nm to less than or equal to about 20 μm.

In various aspects, the one or more capacitor materials 250 include one or more metal oxides (MO, where M is one of cobalt (Co), ruthenium (Ru), niobium (Nb), iridium (Ir), manganese (Mn), chromium (Cr), tantalum (Ta), vanadium (V), and molybdenum (Mo) and 0.5≤x≤3.5), for example one or more metal oxides selected from cobalt oxide ($Co_3O_4$), manganese oxide ($MnO_2$), iridium oxide ($IrO_2$), niobium pentoxide ($Nb_2O_5$), ruthenium oxide ($RuO_2$), tantalum pentoxide ($Ta_2O_5$), tin oxide ($SnO_2$), and vanadium oxide ($V_2O_5$); metal sulfides, for example one or more metal sulfides selected from titanium disulfide ($TiS_2$), copper sulfide (CuS), and iron sulfide (FeS); carbon-based materials, for example one or more carbonaceous materials selected from activated carbon, graphene, graphite, mesoporous carbon, macroporous carbon, single-walled carbon nanotubes, multi-walled carbon nanotubes, carbon aerogels, and activated carbon fiber cloth; and polymer-based materials, for example one or more polymer selected from polyaniline, polyacetylene, poly(3,4-ethylenedioxythiophene), and poly(3,4-ethylenedioxythiophene), poly(4-styrenesulfonate).

In this fashion, in various aspects, the one or more capacitor materials 250 may be selected from the group consisting of: cobalt oxide ($Co_3O_4$), manganese oxide ($MnO_2$), iridium oxide ($IrO_2$), niobium pentoxide ($Nb_2O_5$), ruthenium oxide ($RuO_2$), tantalum pentoxide ($Ta_2O_5$), tin oxide ($SnO_2$), vanadium oxide ($V_2O_5$), titanium disulfide ($TiS_2$), copper sulfide (CuS), iron sulfide (FeS), activated carbon, graphene, graphite, mesoporous carbon, macroporous carbon, single-walled carbon nanotubes, multi-walled carbon nanotubes, carbon aerogels, activated carbon fiber cloth, polyaniline, polyacetylene, poly(3,4-ethylenedioxythiophene), poly(3,4-ethylenedioxythiophene), poly(4-styrenesulfonate), and combinations thereof.

For example only, in instances where the first electroactive material 232 comprises a nickel manganese cobalt (NMC), such as NMC 532, the second electroactive material 234 comprises a distinct NMC, such as NMC 622, and the third electroactive material 236 comprises yet another distinct NMC, such as NMC 721, such as detailed above, the one or more capacitor materials 250 may comprise one or more of activated carbon, (single walled) carbon nanotubes, and graphene. Further, for example only, in instances where the first, second, and third electroactive materials 232, 234, 236 may comprise graphite having a different specific capacities, also detailed above, the one or more capacitor materials 250 may comprise one or more of ruthenium oxide ($RuO_2$) and graphene.

Figure 2C:
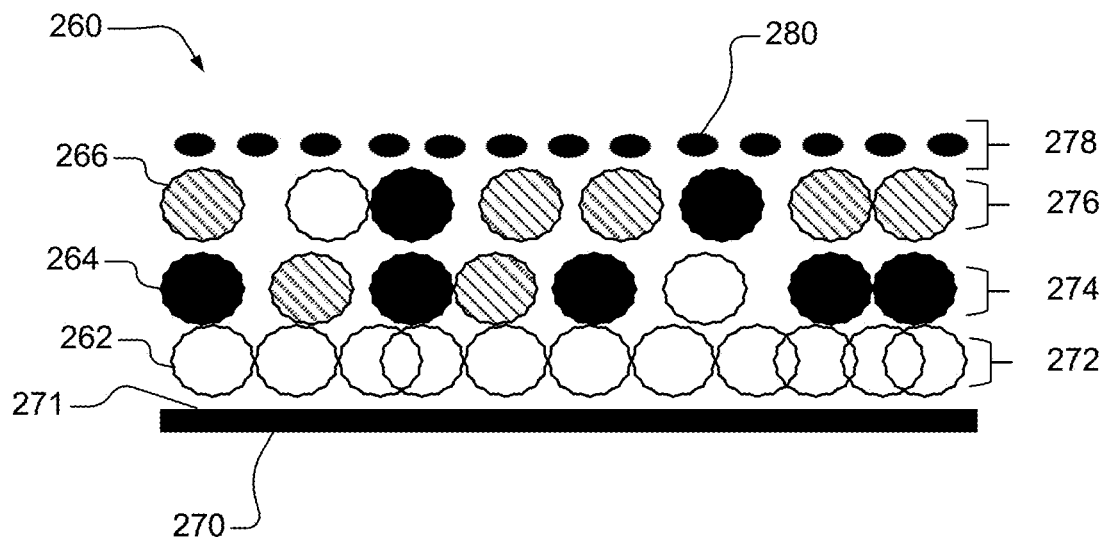
FIG. 2C is an example schematic illustration of another capacity-assisted gradient electrode in accordance with various aspects of the present disclosure.

The electrode 260 illustrated in FIG. 2C includes at least three electroactive materials 262, 264, 266 having different specific capacities disposed in electrical communication with a current collector 270. For example, the electrode 260 may comprise greater than or equal to about 20 wt. % to less than or equal to about 100 wt. %, and in certain aspects, optionally greater than or equal to about 40 wt. % to less than or equal to about 80 wt. %, of a first electroactive material 262; greater than about 0 wt. % to less than or equal to about 80 wt. %, and in certain aspects, optionally greater than or equal to about 20 wt. % to less than or equal to about 80 wt. %, of a second electroactive material 264; and greater than or equal to about 0 wt. % to less than or equal to about 50 wt. %, and in certain aspects, optionally greater than or equal to about 20 wt. % to less than or equal to about 50 wt. %, of a third electroactive material 266.

In various aspects, the at least three electroactive materials 262, 264, 266 may be disposed on or adjacent one or more surfaces of the current collector 270. For example, as illustrated, the at least three electroactive materials 262, 264, 266 may be disposed on or adjacent a first surface 271 of the current collector 270. The skilled artisan will appreciate that in various aspects, the at least three electroactive materials 262, 264, 266 may be further disposed on or adjacent one or more other surfaces of the current collector 270. For example, on or adjacent a second surface that opposes or is parallel with the first surface 271 of the current collector 270.

The first electroactive material 262 may form a first electroactive layer 272 having a first press density. The first electroactive layer 272 may be disposed on or near the current collector 270. The second electroactive material 264 may form a second electroactive layer 274 having a second press density. The second electroactive layer 274 may be disposed on or near a first exposed surface of the first electroactive layer 272. The third electroactive material 266 may form a third electroactive layer 276 having a third press density. The third electroactive layer 276 may be disposed on or near a second exposed surface of the second electroactive layer 274.

In various aspects, the second and third electroactive layers 274, 276 may each comprise one or more of the first, second, and third electroactive materials 262, 264, 266. In certain aspects, the first electroactive layer 272 has a first average reversible specific capacity, the second electroactive layer 274 has a second average reversible specific capacity, and the third electroactive layer 276 has a third average reversible specific capacity. The second average reversible specific capacity may be greater than the third average reversible specific capacity. The first average reversible specific capacity may be greater than the second average reversible specific capacity.

In various aspects, electrode 260 may further include one or more capacitor materials 280 disposed on, or in certain aspects, intermingled with, one or more of the at least three electroactive materials 262, 264, 266. For example, as illustrated, the one or more capacitor materials 280 may be disposed on or near an exposed surface of the third electroactive material layer 276 so as to form a capacitor material layer 278.

The one or more capacitor materials 280 include one or more metal oxides (MOX, where M is one of cobalt (Co), ruthenium (Ru), niobium (Nb), iridium (Ir), manganese (Mn), chromium (Cr), tantalum (Ta), vanadium (V), and molybdenum (Mo) and $0.5 \leq x \leq 3.5$), for example one or more metal oxides selected from cobalt oxide ($Co_3O_4$), manganese oxide ($MnO_2$), iridium oxide ($IrO_2$), niobium pentoxide ($Nb_2O_5$), ruthenium oxide ($RuO_2$), tantalum pentoxide ($Ta_2O_5$), tin oxide ($SnO_2$), and vanadium oxide ($V_2O_5$); metal sulfides, for example one or more metal sulfides selected from titanium disulfide ($TiS_2$), copper sulfide (CuS), and iron sulfide (FeS); carbon-based materials, for example one or more carbonaceous materials selected from activated carbon, graphene, graphite, mesoporous carbon, macroporous carbon, single-walled carbon nanotubes, multi walled carbon nanotubes, carbon aerogels, and activated carbon fiber cloth: and polymer-based materials, for example one or more polymer selected from polyaniline, polyacetylene, poly(3,4-ethylenedioxythiophene), and poly (3,4-ethylenedioxythiophene), poly(4-styrenesulfonate).

In this fashion, in various aspects, the one or more capacitor materials 280 may be selected from the group consisting of: cobalt oxide ($Co_3O_4$), manganese oxide ($MnO_2$), iridium oxide ($IrO_2$), niobium pentoxide ($Nb_2O_5$), ruthenium oxide ($RuO_2$), tantalum pentoxide ($Ta_2O_5$), tin oxide ($SnO_2$), vanadium oxide ($V_2O_5$), titanium disulfide ($TiS_2$), copper sulfide (CuS), iron sulfide (FeS), activated carbon, graphene, graphite, mesoporous carbon, macroporous carbon, single-walled carbon nanotubes, multi-wailed carbon nanotubes, carbon aerogels, activated carbon fiber cloth, polyaniline, polyacetylene, poly(3,4-ethylenedioxythiophene), poly(3,4-ethylenedioxythiophene), poly(4-styrenesulfonate), and combinations thereof.

Figure 2D:
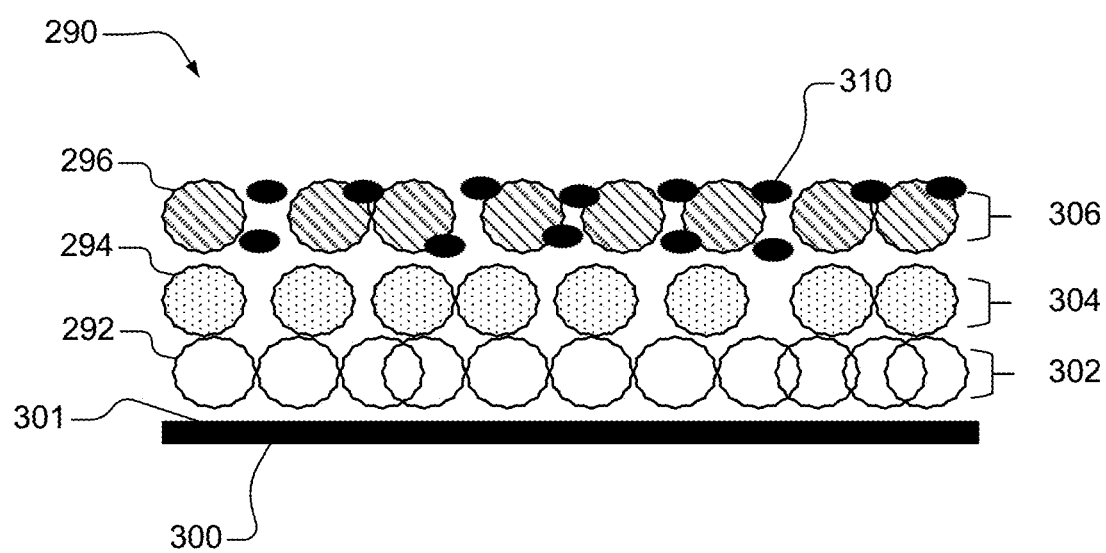
FIG. 2D is an example schematic illustration of another capacity-assisted gradient electrode in accordance with various aspects of the present disclosure.

In various instances, as illustrated in FIG. 2D, the one or more capacitor materials 310 may be intermingled with a third electroactive material layer 306 furthest from the current collector. Electrode 290 includes at least three electroactive materials 292, 294, 296 having different specific capacities disposed in electrical communication with a current collector 300. For example, the at least three electroactive materials 292, 294, 296 may be disposed on or adjacent a first surface 301 of the current collector 300.

A first electroactive material 292 may form a first electroactive material layer 302 having a first press density. A second electroactive material 294 may form a second electroactive material layer 304 having a second press density. A third electroactive material 296 may form a third electroactive material layer 306 having a third press density. The first electroactive material layer 302 may be disposed on or near the current collector 300. The second electroactive material layer 304 may be disposed on or near a first exposed surface of the first electroactive material layer 302, and the third electroactive material layer 306 may be disposed on or near a first exposed surface of the second electroactive material layer 304. In certain instances, the first press density may be greater than the second press density and the second press density may be greater than the third press density.

Figure 3:
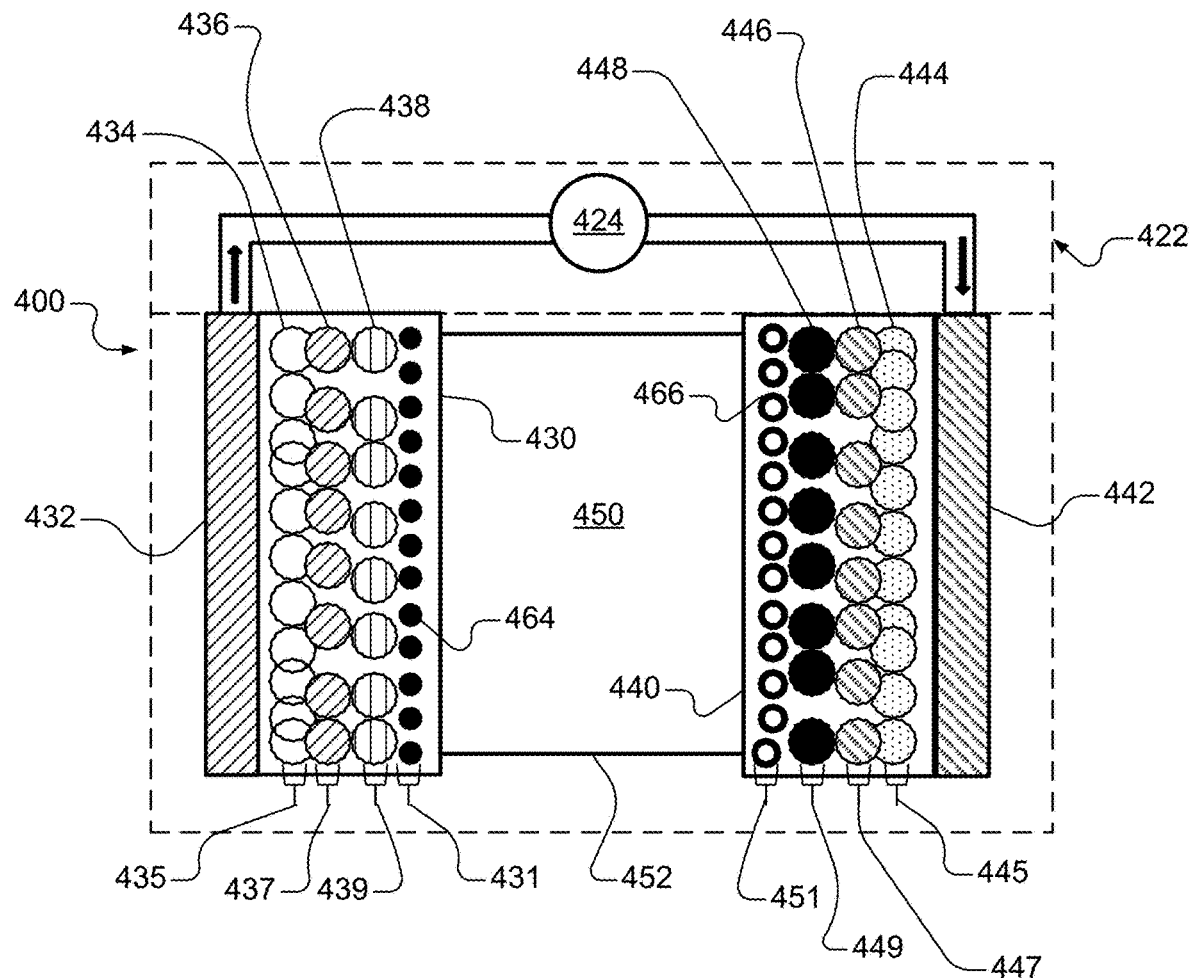
FIG. 3 is an example schematic illustration of an electrochemical cell having capacitor-assisted gradient electrodes in accordance with various aspects of the present disclosure.

In various aspects, the embodiments shown are representative, but not necessarily limiting, of capacitor-assisted gradient electrodes and/or electrochemical cells, including capacitor-assisted gradient electrodes in accordance with the present teachings. Electrode gradients and/or capacitor materials may be employed in a variety of other design configurations to provide electrochemical cells having improved regeneration. As such, the skilled artisan will appreciate that the features detailed with respect to the battery 20 illustrated in FIG. 1 and/or the electrodes 200, 230, 260, and 290 illustrated in FIGS. 2A-2D may apply to various other electrochemical devices and structures, including, for example, in cells having additional layers and/or electrodes and/or composites. Further, the skilled artisan will appreciate that details illustrated in FIGS. 1 and 2A-2D also extend to various stacked and/or wound rolled configurations. For example, in various aspects, an electrochemical cell may integrate one or more capacitor materials into one or both of a positive and negative electrode. For example, the one or more capacitor materials may be incorporated into a positive electrode (and not a negative electrode) so as to reduce degradation in the event of high charge rates, which can be particularly accommodating in the instances of silicon-containing negative electrodes. For example, FIG. 3 illustrates an example battery 400 where both the electrodes 430, 440 comprise gradient structures and one or more capacitor materials 464, 466.

Battery 400 includes a negative electrode 430, a positive electrode 440, and a separator 452 disposed between the electrodes 430, 440. The negative and positive electrodes 430, 440 and/or the separator 452 may each include an electrolyte solution or system 450. A negative electrode current collector 432 may be positioned at or near the negative electrode 430, and a positive electrode current collector 442 may be positioned at or near the positive electrode 440. The negative electrode current collector 432 and the positive electrode current collector 442 respectively collect and move free electrons to and from an external circuit 422. For example, an interruptible external circuit 422 and a load device 424 may connect the negative electrode 430 (through the negative electrode current collector 432) and the positive electrode 440 (through the positive electrode current collector 442).

In various aspects, the negative electrode 430 may include at least three electroactive materials 434, 436, 438 disposed in electrical communication with a current collector 432. For example, the at least three electroactive materials 434, 436, 438 may be disposed on or adjacent a first surface of the current collector 432. The negative electrode 430 may comprise greater than or equal to about 20 wt. % to less than or equal to about 100 wt. %, and, in certain aspects, optionally greater than or equal to about 30 wt. % to less than or equal to about 80 wt. %, of a first electroactive material 434; greater than about 0 wt. % to less than or equal to about 80 wt. %, and in certain aspects, optionally greater than or equal to about 20 wt. % to less than or equal to about 70 wt. %, of a second electroactive material 436; and greater than about 0 wt. % to less than or equal to about 50 wt. %, and in certain aspects, optionally greater than or equal to about 20 wt. % to less than or equal to about 50 wt. %, of a third electroactive material 438. The at least three electroactive materials 434, 436, 438 may each be independently selected from the group consisting of: lithium, lithium metal, silicon, silicon oxide, graphite, graphene, carbon nanotubes titanium oxide ($Li_4Ti_5O_{12}$), tin (Sn), tin oxide ($SnO_2$), tin alloy ($Cu_6Sn_5$), vanadium oxide ($V_2O_5$), titanium dioxide ($TiO_2$), titanium niobium oxide ($Ti_xNb_yO_z$, where $0 \leq x \leq 2$, $0 \leq y \leq 24$, and $0 \leq z \leq 64$), iron sulfide (FeS), and combinations thereof.

In various aspects, the first electroactive material 434 may have a first average reversible specific capacity, the second electroactive material 436 may have a second average reversible specific capacity, and the third electroactive material 438 may have a third average reversible specific capacity. In various instances, the first average reversible specific capacity may be greater than the second average reversible specific capacity, and the second average reversible specific capacity may be greater than the third average reversible specific capacity. In certain aspects, the first electroactive material 434 may form a first electroactive material layer 435, the second electroactive material 436 may form a second electroactive material layer 437, and the third electroactive material 438 may form a third electroactive material layer 439. The first electroactive material layer 435 may be disposed on or near the negative electrode current collector 432. The second electroactive material layer 437 may be disposed on or near a first exposed surface of the first electroactive material layer 435, and the third electroactive material layer 439 may be disposed on or near a first exposed surface of the second electroactive material layer 437.

The first electroactive material layer 435 may have a first press density, the second electroactive material layer 437 may have a second press density, and the third electroactive material layer 439 may have a third press density. In certain instances, the first press density may be greater than the second press density and the second press density may be greater than the third press density.

For example, in the instance of positive electrodes, the first press density may be greater than or equal to about 2 g/cc to less than or equal to about 3.5 g/cc, and in certain aspects, optionally greater than or equal to about 3 g/cc to less than or equal to about 3.5 g/cc. The second press density may be greater than or equal to about 2 g/cc to less than or equal to about 3.5 g/cc, and in certain aspects, optionally greater than or equal to about 2.9 g/cc to less than or equal to about 3.3 g/cc. The third press density may be greater than or equal to about 2 g/cc to less than or equal to about 3.5 g/cc, and in certain aspects, optionally greater than or equal to about 2.8 g/cc to less than or equal to about 3.3 g/cc.

In the instance of negative electrodes, the first press density may be greater than or equal to about 1 g/cc to less than or equal to about 2 g/cc, and in certain aspects, optionally greater than or equal to about 1.6 g/cc to less than or equal to about 1.9 g/cc. The second press density may be greater than or equal to about 1 g/cc to less than or equal to about 2 g/cc, and in certain aspects, optionally greater than or equal to about 1.5 Wee to less than or equal to about 1.8 g/cc. The third press density may be greater than or equal to about 1 g/cc to less than or equal to about 2 g/cc, and in certain aspects, optionally greater than or equal to about 1.5 g/cc to less than or equal to about 1.7 g/cc.

In various aspects, similar to electrodes 30, 40 illustrated in FIG. 1, negative electrode 430 may further include one or more capacitor materials 464 disposed on, or in certain aspects, intermingled with, the at least three electroactive materials 434, 436, 438. For example, negative electrode 430 may comprise greater than or equal to about 0 wt. % to less than or equal to about 10 wt. %, and in certain aspects, optionally greater than or equal to about 0.01 wt. % to less than or equal to about 1 wt. %, of the one or more capacitor materials 464.

The one or more capacitor materials 464 include one or more metal oxides (MOX, where M is one of cobalt (Co), ruthenium (Ru), niobium (Nb), iridium (Ir), manganese (Mn), chromium (Cr), tantalum (Ta), vanadium (V), and molybdenum (Mo) and $0.5 \leq x \leq 3.5$), for example one or more metal oxides selected from cobalt oxide ($Co_3O_4$), manganese oxide ($MnO_2$), iridium oxide ($IrO_2$), niobium pentoxide ($Nb_2O_5$), ruthenium oxide ($RuO_2$), tantalum pentoxide ($Ta_2O_5$), tin oxide ($SnO_2$), and vanadium oxide ($V_2O_5$); metal sulfides, for example one or more metal sulfides selected from titanium disulfide ($TiS_2$), copper sulfide (CuS), and iron sulfide (FeS); carbon-based materials, for example one or more carbonaceous materials selected from activated carbon, graphene, graphite, mesoporous carbon, macroporous carbon, single-walled carbon nanotubes, multi-wailed carbon nanotubes, carbon aerogels, and activated carbon fiber cloth; and polymer-based materials, for example one or more polymer selected from polyaniline, polyacetylene, poly(3,4-ethylenedioxythiophene), and poly (3,4-ethylenedioxythiophene), poly(4-styrenesulfonate).

In this fashion, in various aspects, the one or more capacitor materials 464 may be selected from the group consisting of: cobalt oxide ($Co_3O_4$), manganese oxide ($MnO_2$), iridium oxide ($IrO_2$), niobium pentoxide ($Nb_2O_5$), ruthenium oxide ($RuO_2$), tantalum pentoxide ($Ta_2O_5$), tin oxide ($SnO_2$), vanadium oxide ($V_2O_5$), titanium disulfide ($TiS_2$), copper sulfide (CuS), iron sulfide (FeS), activated carbon, graphene, graphite, mesoporous carbon, macroporous carbon, single-walled carbon nanotubes, multi-walled carbon nanotubes, carbon aerogels, activated carbon fiber cloth, polyaniline, polyacetylene, poly(3,4-ethylenedioxythiophene), poly(3,4-ethylenedioxythiophene), poly(4-styrenesulfonate), and combinations thereof.

In various aspects, as illustrated, the one or more capacitor materials 464 may be disposed on or near an exposed surface of the third electroactive material layer 439 so as to form a capacitor material layer 431. The capacitor material layer 431 may have a thickness greater than or equal to about 10 nm to less than or equal to about 1 mm, and in certain aspects, optionally greater than or equal to about 100 nm to less than or equal to about 20 µm.

In various aspects, the positive electrode 440 may include at least three electroactive materials 444, 446, 448 disposed in electrical communication with a current collector 442. For example, the at least three electroactive materials 444, 446, 448 may be disposed on or adjacent a first surface of the current collector 442. The positive electrode 440 may comprise greater than or equal to about 20 wt. % to less than or equal to about 100 wt. %, and, in certain aspects, optionally greater than or equal to about 30 wt. % to less than or equal to about 80 wt. %, of a first electroactive material 444; greater than about 0 wt. % to less than or equal to about 80 wt. %, and in certain aspects, optionally greater than or equal to about 20 wt. % to less than or equal to about 70 wt. %, of a second electroactive material 446; and greater than about 0 wt. % to less than or equal to about 50 wt. %, and in certain aspects, optionally greater than or equal to about 10 wt. % to less than or equal to about 50 wt. %, of a third electroactive material 448. The at least three electroactive materials 444, 446, 448 may each be independently selected from the group consisting of: $LiNi_xMn_yCo_{1-x-y}O_2$ (where $0 \leq x \leq 1$ and $0 \leq y \leq 1$), $LiNi_xMn_{1-x}O_2$ (where $0 \leq x \leq 1$), $Li_{1+x}MO_2$ (where M is one of Mn, Ni, Co, and Al and $0 \leq x \leq 1$) (for example $LiCoO_2$ (LCO), $LiNiO_2$, $LiMnO_2$, $LiNi_{0.5}Mn_{0.5}O_2$, NMC111, NMC523, NMC622, NMC721, NMC811, NMC165, NMC174, NCA), $LiMn_2O_4$ (LMO), $LiNi_{0.5}Mn_{1.5}O_4$, $LiV_2(PO_4)_3$, $LiFePO_4$, $LiCoPO_4$, $LiMnPO_4$, $LiWO_4F$, $LiFeBO_3$, $LiCoBO_3$, $LiMnBO_3$, $Li_2FeSiO_4$, $Li_2MnSiO_4$, $LiMnSiO_4F$, and combinations thereof.

In various aspects, the first electroactive material 444 may have a first average reversible specific capacity, the second electroactive material 446 may have a second average reversible specific capacity, and the third electroactive material 448 may have a third average reversible specific capacity. In various instances, the first average reversible specific capacity may be less than the second average reversible specific capacity, and the second average reversible specific capacity may be less than the third average reversible specific capacity. In certain aspects, the first electroactive material 444 may form a first electroactive material layer 445, the second electroactive material 446 may form a second electroactive material layer 447, and the third electroactive material 448 may form a third electroactive material layer 449. The first electroactive material layer 445 may be disposed on or near the positive electrode current collector 442. The second electroactive material layer 447 may be disposed on or near a first exposed surface of the first electroactive material layer 445, and the third electroactive material layer 449 may be disposed on or near a first exposed surface of the second electroactive material layer 447.

The first electroactive material layer 445 may have a first press density, the second electroactive material layer 447 may have a second press density, and the third electroactive material layer 449 may have a third press density. In certain instances, the first press density may be greater than the second press density and the second press density may be greater than the third press density. For example, the first press density may be greater than or equal to about 2 g/cc to less than or equal to about 3.5 g/cc, and in certain aspects, optionally greater than or equal to about 3 g/cc to less than or equal to about 3.5 g/cc. The second press density may be greater than or equal to about 2 g/cc to less than or equal to about 3.5 g/cc, and in certain aspects, optionally greater than or equal to about 2.9 g/cc to less than or equal to about 3.3 g/cc. The third press density may be greater than or equal to about 2 g/cc to less than or equal to about 3.5 g/cc, and in certain aspects, optionally greater than or equal to about 2.8 g/cc to less than or equal to about 3.3 g/cc.

In various aspects, similar to electrodes 30, 40 illustrated in FIG. 1, positive electrode 440 may further include one or more capacitor materials 466 disposed on, or in certain aspects, intermingled with, the at least three electroactive materials 444, 446, 448. For example, positive electrode 440 may comprise greater than or equal to about 0 wt. % to less than or equal to about 10 wt. %, and in certain aspects, optionally greater than or equal to about 0.01 wt. % to less than or equal to about 1 wt. %, of the one or more capacitor materials 466. The one or more capacitor materials 466 include one or more metal oxides (MO, where M is one of cobalt (Co), ruthenium (Ru), niobium (Nb), iridium (Ir), manganese (Mn), chromium (Cr), tantalum (Ta), vanadium (V), and molybdenum (Mo) and $0.5 \leq x \leq 3.5$), for example one or more metal oxides selected from cobalt oxide ($Co_3O_4$), manganese oxide ($MnO_2$), iridium oxide ($IrO_2$), niobium pentoxide ($Nb_2O_5$), ruthenium oxide ($RuO_2$), tantalum pentoxide ($Ta_2O_5$), tin oxide ($SnO_2$), and vanadium oxide ($V_2O_5$); metal sulfides, for example one or more metal sulfides selected from titanium disulfide ($TiS_2$), copper sulfide (CuS), and iron sulfide (FeS); carbon-based materials, for example one or more carbonaceous materials selected from activated carbon, graphene, graphite, mesoporous carbon, macroporous carbon, single-walled carbon nanotubes, multi-walled carbon nanotubes, carbon aerogels, and activated carbon fiber cloth; and polymer-based materials, for example one or more polymer selected from polyaniline, polyacetylene, poly(3,4-ethylenedioxythiophene), and poly(3,4-ethylenedioxythiophene), poly(4-styrenesulfonate).

In this fashion, in various aspects, the one or more capacitor materials 466 may be selected from the group consisting of: cobalt oxide ($Co_3O_4$), manganese oxide ($MnO_2$), iridium oxide ($IrO_2$), niobium pentoxide ($Nb_2O_5$), ruthenium oxide ($RuO_2$), tantalum pentoxide ($Ta_2O_5$), tin oxide ($SnO_2$), vanadium oxide ($V_2O_5$), titanium disulfide ($TiS_2$), copper sulfide (CuS), iron sulfide (FeS), activated carbon, graphene, graphite, mesoporous carbon, macroporous carbon, single-walled carbon nanotubes, multi-walled carbon nanotubes, carbon aerogels, activated carbon fiber cloth, polyaniline, polyacetylene, poly(3,4-ethylenedioxythiophene), poly(3,4-ethylenedioxythiophene), poly(4-styrenesulfonate), and combinations thereof.

In various aspects, as illustrated, the one or more capacitor materials 466 may be disposed on or near an exposed surface of the third electroactive material layer 449 so as to form a capacitor material layer 451. The capacitor material layer 451 may have a thickness greater than or equal to about 10 nm to less than or equal to about 1 mm, and in certain aspects, optionally greater than or equal to about 100 nm to less than or equal to about 20 μm.

The skilled artisan will understand that in various aspects battery 400 may have various other structures, including, for example, in cells having additional layers and/or electrodes and/or composites, as well as positive and negative electrodes having various other layered densities and charge capacities.

In various aspects, the present disclosure provides a method of forming a capacity-assisted gradient electrode, such as the capacity-assisted gradient electrodes 200, 230, 260, 290 illustrated in FIGS. 2A-2D. The method includes disposing one or more first electroactive materials on an exposed surface of a current collector. For example, in various instances, the one or more first electroactive materials may be disposed using, for example, a die-coating process of a dry powder pressing process. In certain aspects, the one or more capacitor materials are included with the one or more first electroactive materials. The method may include drying the one or more disposed first electroactive materials and/or capacitor materials, for example by heating the one or more disposed first electroactive materials to a temperature greater than or equal to about 100° C. to less than or equal to about 300° C. for a time period greater than or equal to about 1 minute to less than or equal to about 60 minutes. Pressing may then be applied to the one or more disposed first electroactive materials to densify a first electroactive material layer.

The method may further include disposing, for example using a die-coating process, one or more second electroactive materials on an exposed surface of the first electroactive material layer. In certain aspects, the one or more capacitor materials are included with the one or more second electroactive materials. The method may include drying the one or more disposed second electroactive materials, for example by heating the one or more disposed first electroactive materials to a temperature greater than or equal to about 100° C. to less than or equal to about 300° C. for a time period greater than or equal to about 1 minute to less than or equal to about 60 minutes. Pressing may then be applied to the one or more disposed second electroactive materials to densify a second electroactive material layer. In certain aspects, one or more capacitor materials may be disposed on one or exposed surfaces of the one or more first electroactive materials and/or the one or more second electroactive materials. The skilled artisan will appreciate that various numbers of disposing, heating, and pressing steps may be performed to obtain the desired electrode configuration.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A capacitor-assisted electrode for an electrochemical cell that cycles lithium ions comprising:
at least three electroactive material layers disposed on one or more surfaces of a current collector,
wherein a first electroactive material layer of the at least three electroactive material layers has a first reversible specific capacity and is disposed adjacent to the one or more surfaces of the current collector, the first electroactive material layer defines a first exposed surface and comprises a first amount of a first electroactive material;
wherein a second electroactive material layer of the at least three electroactive material layers has a second reversible specific capacity and is disposed adjacent to the first exposed surface of the first electroactive material layer, the second electroactive material layer defines a second exposed surface, the second electroactive material layer comprising a second amount of the first electroactive material, a first amount of a second electroactive material, and a first amount of a third electroactive material, a first combined amount of the second electroactive material and the third electroactive material being greater than the second amount of the first electroactive material, the first amount of the second electroactive material being larger than the first amount of the third electroactive material;
wherein a third electroactive material layer of the at least three electroactive material layers has a third reversible specific capacity and is disposed adjacent to the second exposed surface of the second electroactive material layer, the third electroactive material layer comprising a third amount of the first electroactive material, a second amount of the second electroactive material, and a second amount of the third electroactive material, a second combined amount of the second electroactive material and the third electroactive material being greater than the third amount of the first electroactive material, the second amount of the third electroactive material being larger than the second amount of the second electroactive material;
wherein the third reversible specific capacity is different from the second reversible specific capacity, the second reversible specific capacity is different from the first reversible specific capacity, and the first reversible specific capacity is different from the third reversible specific capacity; and
wherein at least one of the following is true: (i) the third reversible specific capacity is greater than the second reversible specific capacity and the second reversible specific capacity is greater than the first reversible specific capacity and (ii) the second reversible specific capacity is greater than the third reversible specific capacity and the first reversible specific capacity is greater than the second reversible specific capacity; and
one or more capacitor materials disposed on or intermingled with one or more of the at least three electroactive materials.

2. The capacitor-assisted electrode of claim 1, wherein the second reversible specific capacity is greater than the first reversible specific capacity.

3. The capacitor-assisted electrode of claim 1, wherein the first electroactive material layer has a first press density, the second electroactive material layer has a second press density, and the second press density is greater than the first press density.

4. The capacitor-assisted electrode of claim 1, wherein the one or more capacitor materials are intermingled with the third electroactive material to form the third electroactive material layer.

5. The capacitor-assisted electrode of claim 1, wherein the one or more capacitor materials forms a capacitor material layer disposed adjacent to a third exposed surface of the third electroactive material layer.

6. The capacitor-assisted electrode of claim 1, wherein the one or more capacitor materials are selected from the group consisting of: cobalt oxide, manganese oxide, iridium oxide, niobium pentoxide, ruthenium oxide, tantalum pentoxide, tin oxide, vanadium oxide, titanium disulfide, copper sulfide, iron sulfide, activated carbon, graphene, graphite, mesoporous carbon, macroporous carbon, single-walled carbon nanotubes, multi-walled carbon nanotubes, carbon aerogels, activated carbon fiber cloth, polyaniline, polyacetylene, poly (3,4-ethylenedioxythiophene), poly(3,4-ethylenedioxythiophene), poly(4-styrenesulfonate), and combinations thereof.

7. The capacitor-assisted electrode of claim 1, wherein the first electroactive material layer has a first press density, the second electroactive material layer has a second press density, the third electroactive material layer has a third press density, and the third press density is less than or equal to the second press density and the second press density is less than or equal to the first press density.

8. The capacitor-assisted electrode of claim 7, wherein the first press density, the second press density, and the third press density are each independently greater than or equal to about 2.0 g/cc to less than or equal to about 3.5 g/cc.

9. The capacitor-assisted electrode of claim 7, wherein the first press density, the second press density, and the third press density are each independently greater than or equal to about 1.0 g/cc to less than or equal to about 2.0 g/cc.

10. An electrochemical cell that cycles lithium ions comprising:
a first electrode comprising a first electroactive material; and
a second electrode comprising:
a first layer disposed adjacent to a surface of a current collector and comprising a first amount of a second electroactive material, the first layer having a first reversible specific capacity;
a second layer disposed adjacent to a surface of the first layer and comprising the second electroactive material, a third electroactive material, and a fourth electroactive material, the second layer comprising a first combined amount of the third electroactive material and the fourth electroactive material, a second amount of the second electroactive material, a first amount of the third electroactive material, and a first amount of the fourth electroactive material, the first combined amount being greater than the second amount of the second electroactive material, the first amount of the third electroactive material being greater than the first amount of the fourth electroactive material, the second layer having a second reversible specific capacity that is different from the first reversible specific capacity;

a third layer disposed adjacent to a surface of the second layer and comprising the second electroactive material, the third electroactive material, and the fourth electroactive material, the third layer comprising a second combined amount of the third electroactive material and the fourth electroactive material, a third amount of the second electroactive material, a second amount of the third electroactive material, and a second amount of the fourth electroactive material, the second combined amount being greater than the third amount of the second electroactive material, the second amount of the fourth electroactive material being greater than the second amount of the third electroactive material, the third layer having a third reversible specific capacity that is different from both the first reversible specific capacity and the second reversible specific capacity; and one or more capacitor materials disposed adjacent to or intermingled with one or more of the first layer, the second layer, and the third layer.

11. The electrochemical cell of claim 10, wherein the one or more capacitor materials are intermingled with the third layer.

12. The electrochemical cell of claim 10, wherein the first layer has a first press density, the second layer has a second press density, and the third layer has a third press density, and wherein the second press density is greater than the third press density and the first press density is greater than the second press density.

* * * * *